United States Patent
Chittar et al.

(10) Patent No.: US 7,272,821 B2
(45) Date of Patent: Sep. 18, 2007

(54) SYSTEM AND METHOD OF UNIVERSAL PROGRAMMING LANGUAGE CONVERSION

(75) Inventors: Rajendra S. Chittar, Pune (IN); Ojas A. Kale, Pune (IN); Vivek D. Kulkarni, Pune (IN)

(73) Assignee: Tech Mahindra Limited (IN)

( * ) Notice: Subject to any disclaimer, the term of this patent is extended or adjusted under 35 U.S.C. 154(b) by 591 days.

(21) Appl. No.: 10/647,676

(22) Filed: Aug. 25, 2003

(65) Prior Publication Data

US 2005/0050525 A1 Mar. 3, 2005

(51) Int. Cl.
*G06F 9/45* (2006.01)

(52) U.S. Cl. .................................... 717/116
(58) Field of Classification Search ............... 717/136, 717/116
See application file for complete search history.

(56) References Cited

U.S. PATENT DOCUMENTS 4,667,290 A * 5/1987 Goss et al. ................. 717/147

(Continued)

FOREIGN PATENT DOCUMENTS

DE 19617719 11/1997

(Continued)

OTHER PUBLICATIONS

Type Structure for DGC by Kale & Kulkarni, Formal Methods R&D, MBT, Pune. Issue 1.0, Feb. 10, 2000.

(Continued)

*Primary Examiner*—John Chavis
(74) *Attorney, Agent, or Firm*—Schweitzer Cornman Gross & Bondell LLP

(57) ABSTRACT

An apparatus and method for universal programming language conversion between two different sequential programming languages, e.g., sequential procedural and sequential object oriented programming languages. In particular, conversion is between a source program in a first programming language and a target program in a second programming language. Initially, the source program in the first programming language is parsed using a parsing interface specific to the first programming language. All syntax from the parsed source program is then stripped or removed. Classes in a framework are instantiated to capture semantics of the parsed source program independent of syntax and execution model of the sequential programming languages. The classes are C++ classes representing fundamental core constructs of all sequential programming languages. A semantic representation of the parsed source program without any syntax is produced. The semantic representation is received at a printer interface specific to the second programming language and syntax of the target program in the second programming language is added. This same process can be used for either high-level conversion or compilation depending on whether the target programming language is high level or low level, respectively.

12 Claims, 11 Drawing Sheets

U.S. PATENT DOCUMENTS

| | | | |
|---|---|---|---|
| 5,842,204 A | 11/1998 | Andrews et al. | |
| 6,002,874 A * | 12/1999 | Bahrs et al. | 717/157 |
| 6,028,960 A | 2/2000 | Graf et al. | |
| 6,031,993 A | 2/2000 | Andrews et al. | |
| 6,049,822 A * | 4/2000 | Mittal | 709/217 |
| 6,138,169 A * | 10/2000 | Freund et al. | 719/313 |
| 6,219,831 B1 | 4/2001 | Ono | |
| 6,314,429 B1 | 11/2001 | Simser | |
| 6,317,871 B1 | 11/2001 | Andrews et al. | |
| 6,343,372 B1 | 1/2002 | Felty et al. | |
| 6,389,385 B1 | 5/2002 | King | |
| 6,400,688 B1 | 6/2002 | Lau et al. | |
| 6,453,464 B1 | 9/2002 | Sullivan | |
| 6,523,171 B1 * | 2/2003 | Dupuy et al. | 717/136 |
| 6,523,172 B1 * | 2/2003 | Martinez-Guerra et al. | 717/143 |
| 6,526,569 B1 * | 2/2003 | Obin et al. | 717/140 |
| 2002/0026632 A1 | 2/2002 | Fuchs et al. | |
| 2002/0040359 A1 * | 4/2002 | Green et al. | 707/3 |
| 2002/0046393 A1 | 4/2002 | Leino et al. | |
| 2002/0062476 A1 | 5/2002 | Saxe et al. | |
| 2002/0112201 A1 | 8/2002 | Flanagan et al. | |
| 2003/0226132 A1 * | 12/2003 | Tondreau et al. | 717/116 |
| 2006/0277029 A1 * | 12/2006 | Green et al. | 704/4 |

FOREIGN PATENT DOCUMENTS

| | | |
|---|---|---|
| JP | 402240729 A | 9/1990 |

OTHER PUBLICATIONS

Typed DGC Classes, MBT, Feb. 20, 2000.

* cited by examiner

SYSTEM AND METHOD OF UNIVERSAL PROGRAMMING LANGUAGE CONVERSION

BACKGROUND OF THE INVENTION

1. Field of the Invention

The present invention relates to a theoretical model or framework for representing a unification of the semantics of sequential programming languages, i.e., sequential procedural and sequential object oriented programming languages (OOPL), independent of their syntax.

2. Description of Related Art

Type Theory of Programming Languages has been the target of focus as the basis for unification of programming languages. Based on this Type Theory, Microsoft has developed an intermediate language called Typed Intermediate Language (TIL) for their net framework. TIL is a stack-based assembly language and a wrapper for Intel's assembly. It is based on a stack execution model and looks alien to a high-level language programmer. The purpose of TIL is to create a common execution model capable of supporting language interoperability. It has Classes directly built in (thus support for OO) at the Assembly Level. It is desirable, however, to unify programming languages at the level of their Definition and Semantics rather than being tied to the memory execution model of any particular platform. This offers the advantage to customers of converting their applications of any particular platform. This offers the advantage to customers of converting their applications from legacy programming languages to contemporary ones independent of the platform of execution.

The same inventors and assignee of the present invention developed an earlier or predecessor to the present inventive framework referred to as Typed DGC Classes based on: (i) the Theory of Computability; (ii) Axiomatic Semantics of Programming Languages; and (iii) Type Theory of Programming Languages. The Typed DGC Classes were designed to unify programming languages at the level of their Source Language Definition and Semantics however, this framework was only suitable for imperative procedural languages, e.g., C, Pascal and Cobol, and did not have the capability of handling Pointers, Modules, Structures, Classes, and Objects.

It is therefore desirable to develop an improved model or framework to capture the semantics of programming languages that is independent of the syntax of any programming language, independent of the execution platform, and suitable for sequential programming languages (both sequential procedural and sequential object oriented programming languages).

SUMMARY OF THE INVENTION

All computer programming languages fall within the limits defined by the Theory of Computability developed by Turing or equivalent approaches such as Lambda Calculus, Theory of Recursive Functions, or Markov Algorithms. It is desirable to develop a unifying programming language that adheres to these central and underlying concepts.

The present invention is a system and method for universal programming language conversion using a model representing a unification of the semantics of sequential programming languages and is hereinafter referred to as Generic Typed DGC Classes Framework. Development of this Generic Typed DGC Classes Framework was based on the following mathematical principles:

Theory of Computability as described by Martin Davis in the book entitled "*Computability and Unsolvability*", (1982).

Axiomatic Semantics of Programming Languages as disclosed in the publications entitled "*A Discipline of Programming*" by Edsger Dijkstra (1976) and "*Formal Semantics of Programming Languages*" by Glynn Winskel (1993).

Type Theory of Programming Languages as described in the publications entitled "*Structure of Typed Programming Languages*" by David Schmidt (1994) and "*Foundations for Programming Languages*" by John Mitchell (1996).

Every sequential program is limited by these underlying principles. Thus, unification of all sequential programming languages is possible by capturing the semantics of such languages based on these theories.

Specifically, an embodiment of the present invention is directed to a method for universal programming language conversion between two different sequential programming languages. In particular, conversion is between a source program in a first programming language and a target program in a second programming language. Initially, the source program in the first programming language is parsed using a parsing interface specific to the first programming language. All syntax from the parsed source program is then stripped or removed. Classes in a framework are instantiated to capture semantics of the parsed source program independent of syntax and execution model of the sequential programming languages. The classes are C++ classes representing fundamental core constructs of all sequential programming languages. A semantic representation of the parsed source program without any syntax is produced. The semantic representation is received at a printer interface specific to the second programming language and syntax of the target program in the second programming language is added. This process can be used for any type of language conversion, e.g., high level translation or compilation depending on whether the target programming language is high level or low level programming language, respectively.

Another embodiment of the present invention is directed to an apparatus for universal programming language conversion using the method described above. The apparatus comprises a parsing interface specific to the first programming language for parsing the source program in the first programming language and stripping all syntax from the parsed source program. Classes in a framework are instantiated to a produce a semantic representation of the parsed source program independent of syntax and execution model of the sequential programming languages. A printer interface specific to the second programming language is plugged into the back end. The printer interface receives the semantic representation and adds the syntax of the target program in the second programming language.

Still another embodiment of the invention relates to an apparatus for universal programming language conversion between two different sequential programming languages including a source program in a first programming language and a target program in a second programming language, wherein the apparatus comprises a processor for instantiating classes in a framework representing a unification of semantics of the sequential programming languages (e.g., sequential procedural and sequential object oriented programming languages) independent of syntax and execution model.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the similar views and in which.

DETAILED DESCRIPTION OF THE PRESENT INVENTION

Figure 1:
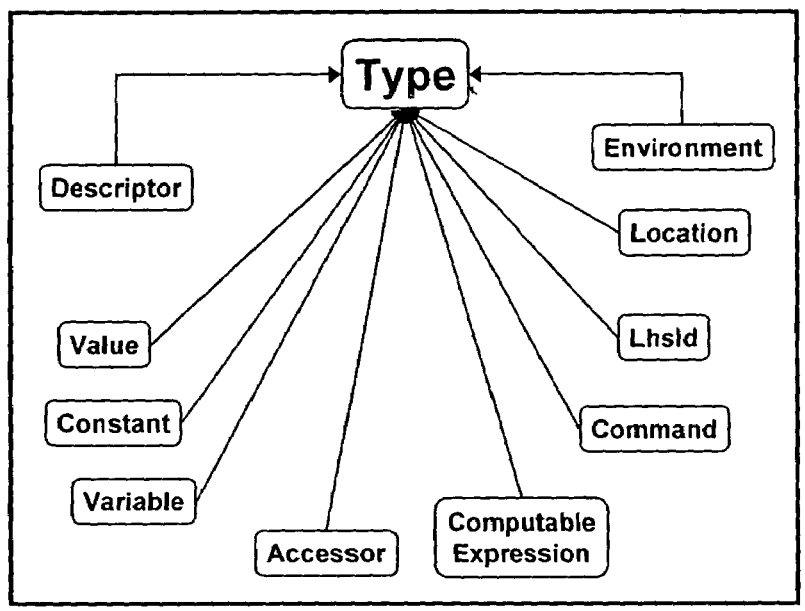
FIG. 1 is an exemplary schematic of the base Type (core constructs) hierarchy identified in the Generic Typed DGC Classes Framework in accordance with the present invention.

The present inventive Generic Typed DGC Classes Framework generically represents the semantics of building blocks of any sequential programming language (both sequential procedural and sequential object-oriented programming languages), independent of its syntax and the execution model for the language on any chip (register-based or stack-based). A computer programming language generally comprises fundamental core constructs (which make the language Turing-complete) and advanced constructs. An advanced construct is simply a shorthand way to express a combination of one or more fundamental core constructs thereby offering convenience and expressiveness to the programmer. Advanced constructs never add to or enhance the Turing-completeness of any such programming language. Thus, an advanced construct of any programming language can always be constructed from its fundamental core constructs. All programming languages are Turing-complete, but they differ in their syntax of offering the fundamental core constructs required for Turing-completeness. Additionally, some languages offer advanced constructs, which do not enhance the underlying semantical properties of Turing-completeness, but instead are merely composites of its fundamental core constructs.

The present inventive Generic Typed DGC Classes Framework has been developed as a minimal and simple set of C++ Classes that capture the semantics of the constructs in any sequential programming language independent of the syntax of any programming language and the execution model on any chip (e.g., stack based or register based). The Generic Typed DGC Classes Framework is therefore universal in that it is capable of being instantiated for any construct of any sequential programming language, albeit procedural or object-oriented.

The Generic Typed DGC Classes Framework is based on the same theoretical foundations expressed above with respect to its predecessor the Typed DGC Classes and further in consideration of aspects from the Theory of Objects, as written by Cardelli, Luca and Abadi, Martin, in the book under the same name published in 1996. The theories mentioned serve as the basis of universality by which the present inventive Generic Typed DGC Classes Framework may be applied to any sequential programming language. Accordingly, the present inventive Generic Typed DGC Classes Framework is an improvement in that it is suitable for use with a wider range of applications than that of its Typed DGC Classes predecessor.

Any sequential programming language can be broken down into fundamental core constructs that are hereinafter referred to as Types (denoted by bold italics with the first letter capitalized). These constructs serve as the building blocks for different constructs in different programming languages. Thus, all programming language constructs are combinations of these underlying fundamental core constructs (Types). For example, a program is a set of DECLARATIONS followed by a sequence of COMMANDS; an ASSIGNMENT STATEMENT comprises a VARIABLE on the left hand side and an EXPRESSION on the right hand side; and an ITERATION is a repetitive execution of a sequence of COMMANDS. All sequential programming languages differ only with respect to the complexity of compositions of these fundamental core constructs (Types).

Each Type is defined in terms of its algebraic specification, i.e., as an Abstract Data Type (ADT). This algebraic specification translates into a C++ Class (corresponding to the Type under discussion) and its associated members (referring to the operations on that Type) that have been already implemented as a minimal and simple set of C++ Classes which can be instantiated for any construct of any sequential programming language. Thus, the Generic Typed DGC Classes Framework is a C++ Class Library wherein the classes (Types) are instantiated to model the constructs of any sequential programming language.

Every computer programming language has two parts, i.e., states and commands. A variable and its associated value define the state of a system at a given point in time, while a command represents the operation on the state to query or change its associated value. In all programming languages the concept of commands and its representations remain the same, however, the concept of variables and their representation differ in different programming languages.

A Type may be broadly defined as a set of elements that share at least one common property or characteristic. Each programming language offers multiple varieties of Type. Each Type has a TypeName associated with it (as denoted by all capital letters). The TypeName is a unique name or label used to identify each Type. This TypeName corresponds to our intuitive notion of Types.

The interrelation of Types is defined by Typing Rules associated with a particular programming language. FIG. 1 is an exemplary hierarchical listing of base Types (representing hierarchies of related fundamental core constructs) of the present inventive Generic Typed DGC Classes Framework applicable for any sequential programming language. These base Types include: Descriptor, Value, Constant, Variable, Accessor, Computable Expression, Command, Left Hand Side Identification (LhsId), Location and Environment. Two of these identified base Types (i.e., LhsId and Location) will only be instantiated for particular programming languages. Specifically, LhsId will only be instantiated for imperative, not functional, programming languages, whereas Location need only be instantiated for those particular programming languages that employ pointers. The remaining base Types (Descriptor, Value, Constant, Variable, Accessor, Computable Expression, Command and Environment) will be instantiated for every programming language.

Of these base Types, Descriptor and Environment are special categories. Descriptor is used to specify (describe) properties of certain other Types and is used as the basis from which these other Types are constructed. Environment is used for creating and storing other Types (including instances of Descriptor and Environment), that is, Environment is the container for all Types. The Environment recognizes the Types and associated Typing Rules supported by the particular programming language.

An Environment comprises the Language Context (which defines the programming language based on its recognized Types and associated Typing Rules supported by the particular programming language), and the Program State (i.e., the set of Variables and their associated Values declared for a given program). Thus, the Environment is the substrate Type on which a programming language is defined, constructed, and executed.

Data Types may also be classified as a Basic Computable Type or a Composite Type specified (described) by their corresponding Descriptors and the Environment that recognizes or supports them. The term Basic Computable Type is defined as those Types which (i) are not composed from any other Type and (ii) for whom direct computations are possible on their Values.

Some exemplary Basic Computable Types (with their associated conventional TYPENAME identified within [] brackets in all capital letters) include:

Integer [INT] (e.g., −5, −4, −3, −2, −1, 0, 1, 2, 3, 4, 5)
Real [REAL] (e.g., −2.0, −1.3, −0.6, 0, 0.7, 1.0, 1.5, 2.3)
Boolean [BOOL] (e.g., true, false)
Character [CHAR] (e.g., '', a, b, c, d, 1, 2, @, #, ', . . . )
In some programming languages Basic Computable Types also include String [STRING] (e.g., "city", "Boston", "Paul", "123", "101bDH#*^&")
Void [VOID] (null value)

String has been identified as a Basic Computable Type in the present inventive Generic Typed DGC Classes Framework, for matters of practical convenience. However, the present inventive framework could be modified so that only Character is classified as a Basic Computable Typ, while Sting is a Composite Typ as constructed from Character.

The TYPENAME associated with each Type may be selected, as desired, without having any impact on the invention. In the present inventive framework, the Types of INT, REAL, STRING and CHAR have each been assigned a unique Type Name. It is, however, recognized, for example, that ARITHMETIC may be the Type Name used to generically refer to either Integer or Real, while STRING may be used to refer to either Character or String.

Composite Types represent compositions of one or more Basic Computable Types and/or Composite Types. Some exemplary Composite Types may include:

Pointer, which "points to" or "refers to" an element of any Type or a Type that has not yet been specified;
Array, which represents a finite and indexed set of elements of the same Type; and
Record, which represents a finite set of elements that may belong to different Types.

As noted above, each kind of Basic Computable Type and Composite Type is instantiated only through the different kinds of Variables by specifying their corresponding Descriptors and associated Environment that supports or recognizes these Types, as described further below.

The present inventive Generic Typed DGC Classes Framework is explained by first describing the Types and associated Typing Rules and thereafter defining their interconnection within the Environment.

Each Type is axiomatized based on an algebraic specification (an Abstract Data Type (ADT)) as prescribed by Meyer, Bertrand, in the publication entitled "*Object-Oriented Software Construction*", (1977)($2^{nd}$ Ed.), which in turn is based on the theory of Many-Sorted Algebras. This algebraic specification comprises a Signature representing the set {S, Ω}, where S represents the Sort(Type) under construction and Ω is its associated set of operators. This specification directly translates into a Class (i.e., Type) and its associated members (i.e., operations on that Type). Three distinct categories of Operators are defined viz: Creators, Modifiers, and Queries. Creators create Types, Modifiers modify or change Types, while Queries return information about Types (without changing them). Properties associated with each Type are represented as Axioms and Preconditions. Axioms describe properties to be adhered to for any instance of a particular Type that is the target or subject of any operator; while Preconditions represent the properties to be satisfied for any instance of a particular Typ prior to being the target of any Operator.

Instantiation of this algebraic specification for a fundamental or base Abstract Data Type (ADT) generic to all Types is represented as follows:

---

ADT for base Type
S = {Type}
Ω = {
    Creators: None
    Modifiers: None
    Queries:
    GetTypeName:     Type → TypeName
    GetInnerTypeName: Type → TypeName
    Print:     Type → String
}
Axioms:
{
    None
}
Preconditions:
{
    None
}

---

In the generic algebraic specification for base Type above, no Creator is specified. Instead, the Creator for each kind of Type will be specified in its corresponding algebraic specification. Each kind of Type always has at least two associated Type Names, which are built-into each instance at the time of their creation into the Environment. Some Types may have more than two TYPENAMEs. One of these TYPENAMEs referred to as "Typenam" represents that name of the particular Type (e.g., Descriptor, Variable or Command), whereas the other Type Name referred to as "InnerTypeNam" represents the kind of the particular Type, that is, the kind of Basic Computable Type (e.g., Integer, Boolean, Real, Character, Address, String, Void) or the kind of Composite Type (e.g., Array, Record, Pointer, Function).

This ADT for base Type represents the parent or base Sort(Type) from which all other Types are derived. In accordance with accepted inheritance principles associated with object oriented programming languages, a more enhanced or specific derived Sort(Type) may be created from this more generic parent or base Sort(Type). All derived Sort(Type) will always inherit all Operators and Properties (e.g., Axioms and Preconditions) associated with the parent or base Sort(Type). These inherited Operators and their associated Properties cannot be eliminated but may be appended or enhanced with additional Operators, additional Properties, inherited Operators and/or inherited Properties may be strengthened (e.g., via additional Operators and/or Properties). For ease of convenience in the descriptions provided below the Operators associated with the base Sort(Type) will not necessarily be restated with respect to the particular ADT for a specific kind of derived Sort(Type). Nevertheless, based on the well-established principle of inheritance associated with conventional object oriented programming languages, all Operators and associated Properties associated with the parent or base Sort(Type) will implicitly be included in the derived Sort(Type), regardless of whether they are explicitly mentioned in their respective ADTs.

Creators for all Types (as specified in their respective ADTs described fully below) are actually targeted on the Environment, such that each Creator has Environment as an argument (which is not explicitly mentioned in the ADTs described further below). However, the properties of Data Types (i.e., Basic Computable Types and Composite Types) are captured in appropriate Descriptors, hence these Descriptors are used to instantiate Types.

For each of the Basic Computable Types and Composite Types an appropriate Descriptor specifies its properties. Instantiation of a specific kind of Type is realized using Creator for Variable with respect to each particular Basic Computable Type or Composit Typ. Some exemplary instantiation Creators for Variables include:

"give me a Variable of X", where X is any Basic Computable Type;

"give me a Variable of Pointer with InnerTypeName X";

"give me a Variable of Array of X with n dimensions and $k_1 \ldots k_n$ as bounds of these n dimensions";

"give me a Variable of Recordof Types $t_1 \ldots t_k$."

A Variable needs an instantiation of a Data Type (i.e., Basic Computable Type or a Composite Type). A Type, however, cannot be instantiated within the Environment and then be given to any Variable asking for it—as that implies having an "orphan" Type (i.e., a Type that is instantiated but not associated with any Variable) in the Environment. Hence, the instantiation of Type needs to be done from within the Creator for Variable.

In order to instantiate a specific kind of Data Type, its complete algebraic specification in the form of a Descriptor is passed to the Creator for Variable. Initially, an appropriate Descriptor is obtained from Environment in which the Variable is to be created. This Descriptor may initially be plain (i.e., without any specific content)—e.g., for a Record Variable, a Record Descriptor without any elements). Construction of the Descriptor is completed by using the corresponding defined Operators. Once a Variable has been instantiated by using a Descriptor, thereafter the associated properties of the Descriptor are prevented from being altered.

Descriptors may either be referred to by a Name represented by String that is queried by "GetName" on the Descriptor or alternatively no name may be assigned whereby the String is empty, Thus, two Creators exist for each Descriptor—one with a Name, and the other without a Name. Naming the Descriptor is advantageous in that it allows User-defined Data Types (UDT) and Inheritance from other Named Descriptors. For the purposes of describing the present inventive framework, the possibility of Inheritance from Descriptors has been limited to Record only. However, it is contemplated and within the intended scope of the present invention to alternatively, or in addition thereto, extend Inheritance to other Descriptors.

Figure 2:
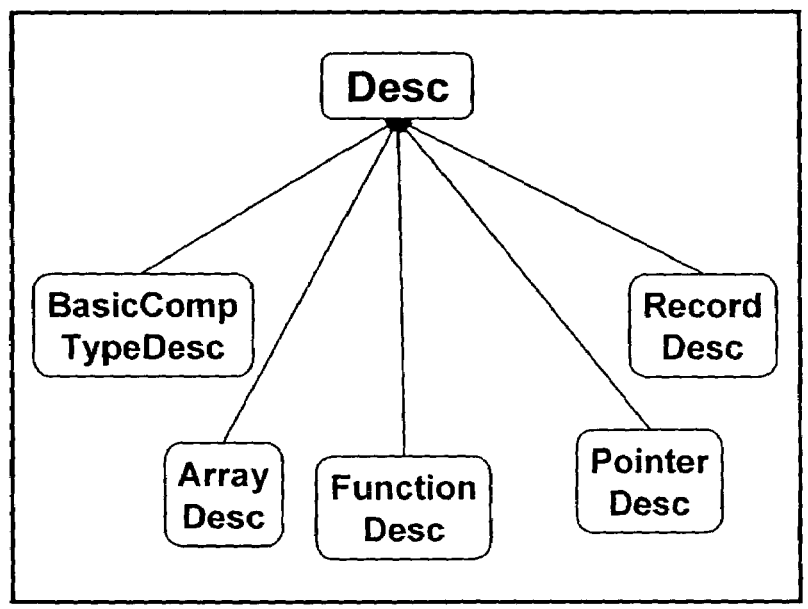
FIG. 2 is an exemplary schematic of the base Descriptor hierarchy identified in the Generic Typed DGC Classes Framework.

FIG. 2 is a hierarchy of the base Descriptor {Desc} and its derived species (e.g., Basic Computable Type Descriptor {BasicCompTypeDesc}, Array Descriptor {ArrayDesc}, Function Descriptor {FunctionDesc}, Pointer Descriptor {P interDesc}, and Record Descriptor {R cordDesc}).

The ADT for base Descriptor is provided below:

```
Base ADT for Descriptor
S = {Desc}
Ω =    {
            Creators:    None
                Once again no Creator is specified in the ADT for the base Descriptor,
                instead the ADT associated with each kind, species or derived
                Descriptor will have its own specified Creator.
                Once a Descriptor has been instantiated (e.g., by a Variable), thereafter
                the properties associated therewith cannot be changed.
            Modifiers:
            IncrInUseCount:      Desc → Desc
            DecrInUseCount:      Desc → Desc
                Increase In Use Count {IncrInUseCount} represents the number of
                Variables that has instantiated the Descriptor.
                After successful creation of the Variable, IncrInUseCount is invoked by
                the Creator of any kind of Variable (on its input Descriptor) to
                increment the value by one.
                The Decrease In Use Count {DecrInUseCount} is invoked to decrease
                the value by one when the Variable is deleted from the Environment.
            Queries:
            IsEqual:             Desc × Desc → Bool
            GetName:             Desc → String
            GetTypeName:         Desc → TypeName
            GetInnerTypeName:    Desc → TypeName
            Print:               Desc → String
            GetInUseCount:       Desc → Int
                The total number of Variables that has instantiated the Descriptor is
                represented by InUseCount.
       }
Axioms:
       {
            Let d be an instance of any kind of Desc.
            Let n be an instance of Int.
            GetTypeName (d) = DESCRIPTOR
            GetInUseCount (d) = n    IMPLIES
                GetInUseCount (IncrInUseCount (d)) = n + 1
            Let d1 be an instance of any kind of Desc (without a Name).
            IsEmpty (GetName (d1)) = T
            Let d2 be an instance of any kind of Desc (with a Name).
            IsEmpty (GetName (d2)) = F
            Let d3 and d4 be instances of any Desc.
            IsEqual (d3, d4)   This Equality Axiom is equivalent to the following
            equivalence conditions being satisfied:
            (
                GetTypeName (d3) = DESCRIPTOR = GetTypeName (d4);
                                AND
                GetInnerTypeName (d3) = GetInnerTypeName (d4)
            )
                The Equality Axiom is true, i.e., d3 and d4 are the same Descriptors if
                two conditions are met - (i) both Descriptors have the same Type Name
                (i.e., DESCRIPTOR), and (ii) their Inner Type Name is the same for both.
                This Equality Axiom is generic to the base Descriptor and may be
                further enhanced with additional equivalence conditions for each
                particular kind of Descriptor.
                Thus, the default Equality Axiom for any Descriptor, as provided above,
                requires equivalence of the corresponding elements of the two structures
                or records. (It is noted that for Descriptor of Record, equivalence of
                Nam is also required, as described further below.)
       }
Preconditions:
       {
            Let d1, d2 be instances of Descriptor.
            For creating any Descriptor with a Name, the Name should not:
                aleady exist in the Environment in which the Descriptor is being
                created, i.e., the Query on the Environment should return FALSE; and
                be empty, i.e., the Query IsEmpty (Name) should return FALSE.
            All Modifiers except IncrInusecount( ) and DecrinUseCount( ) (for any
            Descriptor) require that the query GetInUseCount (Desc) = 0.
       }
```

Now the ADT for each kind of Descriptor (e.g., Basic Computable Type Descriptor, Array Descriptor, Function Descriptor, Pointer Descriptor and Record Descriptor) identified in FIG. 2 will be specified. Once again it is noted that each kind of Descriptor need not necessarily be instantiated depending on the programming language. For example, Array Descriptor, Function Descriptor, Pointer Descriptor and Record Descriptor need only be instantiated for those programming languages that recognize these elements. Each kind of Descriptor is derived from the ADT for base Descriptor, as described above, and therefore inherits all specified properties associated therewith.

The following base or generic Descriptor is provided for all Basic Computable Types:

---

ADT for Basic Computable Types Descriptor
S = {BasicCompTypeDesc}
Ω = {
    Creators:
    BasicCompTypeDesc:        TypeName ↪BasicCompTypeDesc
    NamedBasicCompTypeDesc:  String × TypeName
                               ↪BasicCompTypeDesc
        The symbol ↪used in these Creators and other ADTs below represent a
    partial function.
    Modifiers:      None
    Queries:
    GetCompTypeName:      Desc → TypeName
}
Axioms:
    {
    Let t be a TypeName such that
        t ∈ { BOOL, INT, REAL, CHAR, STRING, ADDRESS, VOID }
    Let d be an instance of BasicCompTypeDesc.
    Let s be an instance of String.
    GetInnerTypeName (d) = BASICCOMPTYPE
    GetCompTypeName (BasicCompTypeDesc (t)) = t
    GetInUseCount (BasicCompTypeDesc (t)) = 0
    GetCompTypeName (NamedBasicCompTypeDesc (s, t)) = t
    GetInUseCount (NamedBasicCompTypeDesc (s, t)) = 0
        BasicCompTypeDesc represents the Basic Computable Type
        Descriptor without a Name assigned thereto.
        NamedBasicCompTypeDesc represents the Basic Computable Type
        Descriptor with a Name assigned thereto represented by an instance s of
        String.
    Let d1, d2 be instances of BasicCompTypeDesc.
    IsEqual (d1, d2)   This Equality Axiom is equivalent to the following
                equivalence conditions being satisfied:
    (
        GetTypeName (d1) = GetTypeName (d2); AND
        GetInnerTypeName (d1) = GetInnerTypeName (d2); AND
        GetCompTypeName (d1) = GetCompTypeName (d2)
    )
        This last equivalence condition in the above-given Equality Axiom has
        been specified for the kind BasicCompTypeDesc in addition to those
        inherited base conditions specified for the ADT for base Descriptor.
    }
Preconditions:
    {
    Let s be an instance of String.
    Let t be a TypeName.
    BasicCompTypeDesc (t)
    NamedBasicCompTypeDesc (s, t)
        Both require that t be a Basic Computable Type:
            t ∈ { BOOL, INT, REAL, CHAR, STRING, ADDRESS, VOID }
    }

---

Figure 3:
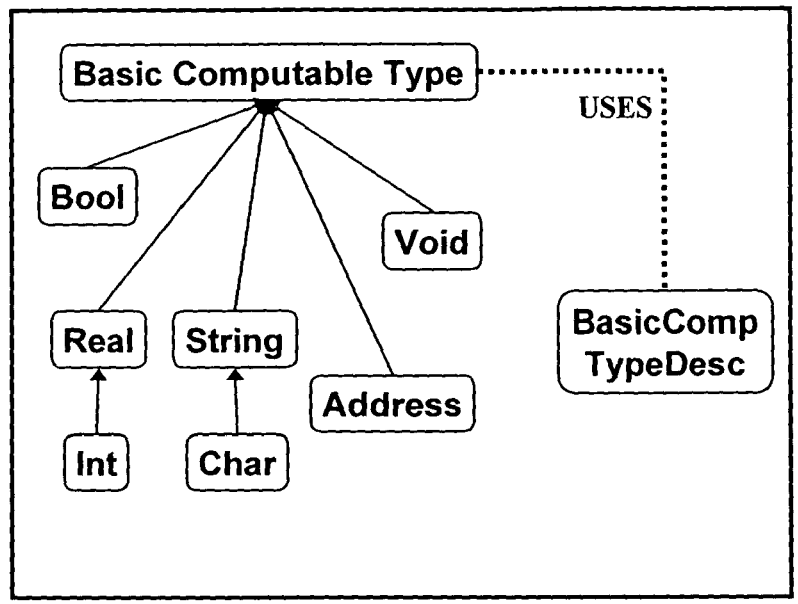
FIG. 3 is an exemplary schematic of the Basic Computable Type Descriptors hierarchy identified in the Generic Typed DGC Classes Framework.

Additional properties may be specified for each kind of BasicCompTypeDesc for TypeName t, where t∈{BOOL, INT, REAL, CRAR, STRING, ADDRESS, VOID}. Instantiations of BasicCompTypeDesc are precisely the corresponding Basic Computable Types, as shown in FIG. 3. Each kind of BasicCompTypeDesc has its own associated Operators that need not been the same. For practical purposes only those Operators necessary for axiomatizing certain Types have been identified in describing the present inventive framework. Theoretically, any Operators that are available at the implementation level for all programming languages but have not been described in the present application can be invoked as and when required.

The properties associated with each kind of BasicCompTypeDesc for TypeName t, where t∈{BOOL, INT, REAP, CHAR, STRING, ADDRESS, VOID} will now be addressed.

---

ADT for the Basic Computable Type Descriptor - Boolean
S = {Bool}
Ω = {
    Creators:     None
    Modifiers:    None
    Queries:
    And:              Bool × Bool → Bool -continued

```
        Or:                  Bool × Bool → Bool
        XOr:                 Bool × Bool → Bool
        Not:                 Bool → Bool
        EqualBool:           Bool × Bool → Bool
        LessThanBool:        Bool × Bool → Bool
        GetCompTypeName:     Bool → TypeName
    }
Axioms:
    {
        Let b be an instance of Bool.
            Bool can take only the symbolic values T or F (which are representations
            of our intuitive Boolean notions of TRUE and FALSE, respectively).
        And (b, Not (b)) = F
        Or (b, Not (b)) = T
        And (b, F) = F
        Or (b, T) = T
        Not (T) = F
        Not (F) = T
        XOr (b, Not (b)) = T
        GetCompTypeName (b) = BOOL
    }
Preconditions:
    {
        None
    }
```

ADT for the Basic Computable Type Descriptor - Integer

S = {Int}

Ω = {
```
        Creators:    None
        Modifiers:   None
        Queries:
        Add:             Int × Int → Int
        Subtract:        Int × Int → Int
        Multiply:        Int × Int → Int
        IntDiv:          Int × Int ↪ Int
            IntDiv is a partial function (denoted by ↪) because the divisor (second
            Int) cannot be zero.
        EqualInt:        Int × Int → Bool
        LessThanInt:     Int × Int → Bool
        GetCompTypeName: Int → TypeName
    }
Axioms:
    {
        Let n be an instance of Int.
        Add (n, 0) = n
        Multiply (n, 1) = n
        Multiply (n, 0) = 0
        GetCompTypeName (n) = INT
    }
Preconditions:
    {
        Let n1, n2 be instances of Int.
        IntDiv (n1, n2)
            Requires: n2 ≠ 0.
    }
```

ADT for the Basic Computable Type Descriptor - Real

S = {Real}

Ω = {
```
        Creators:    None
        Modifiers:   None
        Queries:
        Add:             Real × Real → Real
        Subtract:        Real × Real → Real
        Multiply:        Real × Real → Real
        Div:             Real × Real ↪ Real
            Div is a partial function (denoted by ↪) because the divisor (2nd Real)
            cannot be zero.
        EqualReal:       Real × Real → Bool
        LessThanReal:    Real × Real → Bool
        GetCompTypeName: Real → TypeName
    }
Axioms:
    {
        Let r be an instance of Int or Real.
            r is an instance of Int implies that r is an instance of Real since Int is a
            species or subset of Real.
        Add (r, 0) = r
        Multiply (r, 1) = r
        Multiply (r, 0) = 0
```

```
        GetCompTypeName (r) = REAL
    }
Preconditions:
    {
        Let r1, r2 be instances of Int or Real.
        Div (r1, r2)
            Requires: r2 ≠ 0
    }
ADT for the Basic Computable Type Descriptor - Character
S = {Char}
Ω =    {
        Creators:      None
        Modifiers:     None
        Queries:
        Pred:          Char ↪Char      (Predecessor function)
        Succ:          Char ↪Char      (Successor function)
            Predecessor {Pred} and Successor {Succ} are the ways in which a
            collating sequence is introduced for ordering each instance of Char.
        EqualChar:     Char × Char → Bool
        LessThanChar:  Char × Char → Bool
        GetCompTypeName:   Char → TypeName
    }
Axioms:
    {
        Let c be an instance of Char.
        LessThan (Pred (c), c) = T
        LessThan (c, Succ (c)) = T
        Pred (Succ (c)) = c
        GetCompTypeName (c) = CHAR
    }
Preconditions:
    {
        Where $c_{min}$, $c_{max}$ are special instances of Char such that:
            For all instances c of Char, $c_{min} \leq c \leq c_{max}$
        Pred (c)
            Requires: c ≠ $c_{min}$
        Succ (c)
            Requires: c ≠ $c_{max}$
    }
```

ADT for the Basic Computable Type Descriptor—String

A String need not be considered a Basic Computable Type in that it can easily be constructed from Char. That is, an instance of Char can also be viewed as an instance of String (of a single character). Nevertheless, for convenience a separate algebraic specification and associated Creator is preferably specified for String to justify its construction and the rules to be applied to concatenation and substring operations on Strings.

```
S = {String}
Ω =    {
        Creators:
        String:        φ → String
        Modifiers:     None
        Queries:
        Concat:        String × String → String
            Multiple Strings may be Concatenated {Concat}
            together.
        Substr:        String × Int × Int ↪String
            Substring {Substr} comprising less than all the characters
            may be retrieved from within the String.
            Two parameters are used to identify the Substring, i.e.,
            the first Int representing the position (ordinal) within
            String and the second representing the length (cardinal)
            of the String.
        Length:        String → Int
        IsEmpty:       String → Bool
        EqualString:   String × String → Bool
        LessThanString: String × String → Bool
        GetCompTypeName:   String → TypeName
    }
```

```
Axioms:
    {
        Let s, s1, s2 be instances of String.
        Let n be an instance of Int and c be an instance of Char.
        GetCompTypeName (s) = STRING
        Length (String ( )) = 0
        IsEmpty (s) This Axiom is equivalent to the following
        condition being satisfied: (Length (s) = 0);
        Length (Concat s1, s2) = Add (Length (s1), Length (s2));
        Substr (Concat (s1, s2), 1, Length (s1)) = s1;
        Substr (Concat (s1, s2), Length (s1) + 1, Length (s2)) = s2;
        Concat (Substr (s, 1, n), Substr (s, n + 1, Length (s))) = s;
        The next four Axioms are for an instance of Char
        (viewed as String).
        IsEmpty (c) = F
        Length (c) = 1
        Substr (c, 1, 1) = c
        Length (Concat (s, c)) = Length (s) + 1
    }
Preconditions:
    {
        Let s be an instance of String; and nPos, nLen are instances
        of Int.
        Substr (s, nPos, nLen)
            Requires the following conditions be satisfied:
                Not (IsEmpty (s)); AND
                0 < nPos ≤ Length (s); AND
                0 < nPos + nLen ≤ Length (s)
    }
```

ADT for the Basic Computable Type Descriptor—Address

Address may not be supported by some programming languages as a usable concept by programmers. Nevertheless, Address is classified as a Basic Computable Type in the present inventive Generic Typed DGC Classes Framework. The reasoning behind classifying Address in the present inventive framework as a Basic Computable Type is that it maps onto the concept of Memory Address in the Virtual (or Real) Address Space, however primitive, that is provided by all Operating Systems.

```
S = {Address}
Ω =   {
        Creators:         None
        Modifiers:        None
        Queries:
        EqualAddress:        Address × Address → Bool
        GetCompTypeName:     Address → TypeName
        Previous:            Address → Address
        Next:                Address → Address
            The last two queries are for operations of Address
            arithmetic.
      }
Axioms:
    {
        Let a be an instance of Address.
        GetCompTypeName (a) = ADDRESS
        Previous (Next (a)) = a
    }
Preconditions:
    {
        None
    }
```

ADT for the Basic Computable Type Descriptor—Void

Like Address, Void is also classified in the present inventive framework as a Basic Computable Type despite the fact that it is supported explicitly only by a few programming languages. The reason for Void being classified, as a Basic Computable Type, is that it allows us to:

Cater to flexibility of Typing Rules (as found in Dynamically Typed or UnTyped Programming Languages, for example, PureLisp); and Cater to uninitialized Variables (i.e., undefined Values) in Typed Programming Languages.

```
S = {Void}
Ω =   {
        Creators:         None
        Modifiers:        None
        Queries:
        EqualVoid:           Void × Void → Bool
        GetCompTypeName:     Void → TypeName
      }
Axioms:
    {
        Let v, v1, v2 be instances of Void.
        GetCompTypeName (v) = VOID
        EqualVoid (v1, v2) = F
            Void simply means undefined - hence, the Query IsEqual is
            meaningless but must be formalized. This Axiom has been selected as the
            closest representation of such expression.
    }
Preconditions:
    {
        None
    }
```

Figure 4:
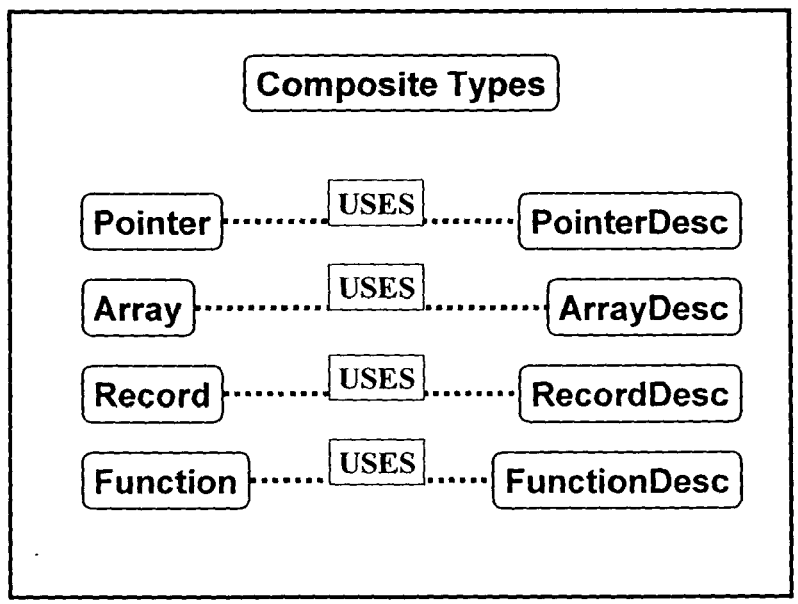
FIG. 4 is an exemplary schematic of the Composite Type Descriptors hierarchy identified in the Generic Typed DGC Classes Framework.

Next the properties associated with each of the Descriptors for the Composite Types, i.e., Pointer {PointerDesc}, Array {ArrayDesc}, Record {RecordDesc}, Function {FunctionDesc}, will be addressed, as shown in FIG. 4. Since instantiations of Descriptors for Composite Types are precisely the corresponding Composite Types, the properties associated therewith are known to the Environment.

ADT for the Descriptor for Pointer

A Pointer is a Composite Type that "points to" or "refers to" an element of any Type. The Descriptor for Pointer {PointerDesc} is specified by the following properties:

---

```
S = {PointerDesc}
Ω =   {
        Creators:
        PointerDesc:        Desc → PointerDesc
        NamedPointerDesc:   Desc × String ↪ PointerDesc
            Desc represents the Descriptor for the Type being "pointed to", while
            PointerDesc represents the Descriptor for Pointer.
        Modifiers:          None
        Queries:
        GetPointedToTypeDesc:   PointerDesc → Desc
        GetPointedToTypeName:   PointerDesc → TypeName
        GetCompTypeName:        PointerDesc → TypeName
      }
Axioms:
      {
        Let p be an instance of PointerDesc. Let d be an instance of Desc.
        Let s be an instance of String.
        GetInnerTypeName (p) = POINTER
        GetCompTypeName (p) = ADDRESS
        At the time of creation, a Pointer Descriptor has "pointed-to" Type set to
        the Descriptor that is passed as its parameter. This is reflected by the
        following four Axioms.
        GetPointedToTypeName (PointerDesc (d)) = GetInnerTypeName (d)
        GetPointedToTypeName (NamedPointerDesc (d, s)) =
                                GetInnerTypeName (d)
        GetPointedToTypeDesc (PointerDesc (d)) = d
        GetPointedToTypeDesc (NamedPointerDesc (d, s)) = d
        GetInUseCount (PointerDesc (d)) = 0
        GetInUseCount (NamedPointerDesc (d, s)) = 0
            InUseCount of the inner (pointed to) Type Descriptor is incremented on
            creation of the PointerDesc.
        Let p1 and p2 be instances of PointerDesc.
        IsEqual (p1, p2)    This Equality Axiom is equivalent to the following
                            conditions being satisfied:
        (
            GetTypeName (p1) = DESCRIPTOR = GetTypeName (p2)
                        AND
            GetInnerTypeName (p1) = POINTER = GetInnerTypeName (p2)
                        AND
            IsEqual (GetPointedToTypeDesc (p1),
                        GetPointedToTypeDesc (p2)) = T
        )
      }
Preconditions:
      {
        None
      }
```

---

ADT for the Descriptor for Array

An Array is described by a combination of all of the following properties and the invariant relations between them:

a Type Descriptor for the "arrayed" Type;

an Integer for maximum number of Dimensions (MaxDim), MaxDim ≧ 1.

a SizeList representing the bounds for each Dimension. Each element of the SizeList is an integer (Int), which represents the Size (bound) for each Dimension (Dim). For each (Dim): Size ≧ 1;

Note: SizeList is a standard List of Int and thus need not be axiomatized further;

an Int for the bound (Size) on each dimension (Dim). For each (Dim): Size ≧ 1; and the Array has the total number of Elements of the "arrayed" Typ given by the formula:

Π(Size(d)) (For all Dim d such that 1 ≦ d ≦ MaxDim).

The properties for the Descriptor for Array are as follows:

---

```
S = {ArrayDesc}
Ω =   {
        Creators:
        ArrayDesc:         Desc × Int × SizeList ↪ ArrayDesc
        NamedArrayDesc:    String × Desc × Int × SizeList ↪ ArrayDesc
```

-continued

```
        Modifiers:          None
        Queries:
        GetArrayedTypeDesc:  ArrayDesc → Desc
        GetArrayedTypeName   ArrayDesc → TypeName
        GetMaxDimension:     ArrayDesc → MaxDim
        GetSizeForDimension: ArrayDesc × Dim ↪ Size
            MaxDim is an Int representing the maximum of Dimensions of the
            Array.
            Dim is an Int representing the Dimension in question, i.e., the
            Dimension whose Size is required.
            Size is an Int representing the size of the Dimension in question.
        GetEnvironment:         ArrayDesc → Environment
            For any ArrayDesc - an Environment is created within it but is not
            mentioned explicitly. This Environment contains the element Variables
            of the Array. This is consistent with the description of the ADT of
            Environment, described further below.
    }
Axioms:
    {
        Let a be an instance of ArrayDesc.
        Let d be an instance of Desc.
        Let k, m, n be instances of Int for Dim, MaxDim and Size, respectively.
        Let s be an instance of String.
```

Let L be an instance of List of m Sizes $S_1$ to $S_m$ indexed by k.
GetInnerTypeName (a) = ARRAY
GetInUseCount (ArrayDesc (d, m, L)) = 0
GetInUseCount (NamedArrayDesc (s, d, m, L)) = 0
InUseCount of the inner (arrayed) Type Descriptor is incremented after
creation of the ArrayDesc.
GetMaxDimension (ArrayDesc (d, m, L)) = m
GetMaxDimension (NamedArrayDesc (s, d, m, L)) = m
GetSizeForDimension (ArrayDesc (d, m, L), k) = $L_k$
GetSizeForDimension (NamedArrayDesc (s, d, m, L), k) = $L_k$
GetArrayedTypeDesc (ArrayDesc (d, m, L)) = d
GetArrayedTypeDesc (NamedArrayDesc (s, d, m, L)) = d
GetArrayedTypeName (ArrayDesc (d, m, L)) = GetInnerTypeName (d)
GetArrayedTypeName (NamedArrayDesc (s, d, m, L)) =
                    GetInnerTypeName (d)

The previous four Axioms are consistent because they will eventually
    lead to the leaf arrayed elements of the Array (in the case of
    compositions of Array of Array of ...) which have to be of a Basic
    Computable Type.
For example, if one has complex, nested data such as an Array of an Array of
Integers, then these Integers (which are of Basic Computable Type) are
the leaves of this structure. The previous four Axioms guarantee that there is
always a way to access each of these Integers in a consistent manner.
Let a1 and a2 be instances of ArrayDesc.
IsEqual (a1, a2)  This Equality Axiom is equivalent to the following
conditions being satisfied:
(
    GetTypeName (a1) = DESCRIPTOR = GetTypeName (a2);
                AND
    GetInnerTypeName (a1) = ARRAY = GetInnerTypeName (a2);
                AND
    IsEqual(GetArrayedTypeDesc(a1), GetArrayedTypeDesc(a2)) = T;
                AND
    GetMaxDimension (a1) = GetMaxDimension (a2);
                AND
    GetSizeForDimension (a1, k) = GetSizeForDimension (a2, k)
        [For all $1 \leq k \leq$ GetMaxDimension (a1)]
)
    }
Preconditions:
    {
        Let a be an instance of ArrayDesc.
        Let d be an instance of Desc.
        Let k be an instance of Int for Dim.
        Let L be an instance of List of m Integers (representing size) $L_1$ to $L_m$
            indexed by k.
        ArrayDesc (d, m, L)
        NamedArrayDesc (s, d, m, L)
            The previous two preconditions require the following conditions be
            satisfied:
                    $1 \leq m$; AND
                    $1 \leq L_k$, for k =1 to m

```
            -continued
    NamedArrayDesc (s, d, m, L)
            Requires:    IsEmpty(s) = F
    GetSizeForDimension (a, k)
            Requires:    1 ≤ k ≤ GetMaxDimension (a)
}
```

ADT for the Descriptor for Record

A Record is defined as a collection of (zero or more) Elements (each having a Descriptor), wherein each Element has a Position (represented by an int) and a Name (represented by a String). The Descriptor for Record {RecordDesc} does not impose any ordering on its Elements nor is any ordering implied by the Position of a particular Element in the Record. Position is merely used for convenience to identify and retrieve a particular Element in the Record.

```
S = {RecordDesc}
Ω =   {
        Creators:
        RecordDesc:             φ → RecordDesc
        NamedRecordDesc:        String ↪RecordDesc
        InheritRecordDesc:      String × List [RecordDesc,
                                    InheritanceMethod] ↪RecordDesc
            List [RecordDesc, InheritanceMethod] is a standard List of
            RecordDesc and its InheritanceMethod such that:
                each RecordDesc should have a Name, which should exist in the
                current Environment where the RecordDesc is being created; and
                each InheritanceMethod is an Int that can hold three values
                representing the method of Inheritance, i.e., Public, Private or
                Protected.
        For any RecordDesc - an Environment is created within it but is not
        mentioned explicitly. This Environment is empty to begin with - except for
        Inherited Record Descriptor {InheritRecordDesc}. Whenever an Element
        is added to the RecordDesc, this Environment is updated to reflect it. This
        is consistent with the description of the ADT of Environment, described
        further below.
        Modifiers:
        AddElementToRecordDesc:  RecordDesc × String × Desc ×
                                    StaticStatus
                                    × ComputableExpr × InheritStatus
                                    ↪RecordDesc
            String represents the Name of the Element being added, while Desc
            represents the Descriptor that specifies its properties.
            InheritStatus is of Type Int and is similar to the Integer Value
            Inheritance Method used in constructing the Inherited Record
            Descriptor.
            The InheritStatus takes one of three values, viz:
                0 - Private, i.e., not visible to any inheriting Desc and unknown to
                anyone outside the Desc. This is preferably the default value.
                1 - Protected, i.e., visible to the inheriting Desc, but unknown to
                anyone outside the Desc.
                2 - Public, i.e., visible to the inheriting Desc, and also known to
                anyone outside the Desc.
            As the name and the values suggest, InheritStatus is used for tracking
            Inheritance for Classes in Object Oriented Programming Languages
            (OOPL).
            StaticStatus is of Type Boolean {Bool} to indicate whether the
            Element being added is static, i.e., its value is commonly shared by all
            instances of the RecordDesc when it is instantiated.
        Queries:
        GetMaxNoOfSelfElements:         RecordDesc → Int
            An Element of RecordDesc can be retrieved by either its Name or its
            Position. The Name of the Element is retrieved by its Position and then
            the properties of the Element are retrieved by the Name.
        IsSelfElement:                  RecordDesc × String → Bool
        GetSelfElementName:             RecordDesc × Int ↪String
        GetSelfElementDesc:             RecordDesc × String ↪Desc
        GetSelfElementInheritStatus:    RecordDesc × String
                                            ↪InheritStatus
        GetSelfElementStaticStatus:     RecordDesc × String ↪StaticStatus
        GetSelfElementTypeName:         RecordDesc × String ↪TypeName
        GetSelfElementDefaultExpr:      RecordDesc × String↪
                                            ComputableExpr
        GetEnvironment:                 RecordDesc → Environment
        IsAccesible:                    RecordDesc × String → Bool
        GetAccessibleElementName:       RecordDesc × Int ↪String
```

-continued

```
GetAccessibleElementDesc:       RecordDesc × Int ↪Desc
GetMaxNoOfAccessibleElements:   RecordDesc → Int
    AccessibleElement is that whose InheritStatus is Public - i.e., the
    Element is accessible outside the Descriptor - irrespective of whether it
    is a SelfElement or an Element inherited from one of its parents.
Queries for Inheritance:
GetMaxNoOfBaseDescriptors:      RecordDesc → Int
GetBaseDescriptor:              RecordDesc × Int ↪RecordDesc
GetBaseInheritanceMethod:       RecordDesc × Int
                                    ↪InheritanceMethod
}
```

Axioms:
{

Let r be an instance of RecordDesc.
Let s be an instance of String.
Let d be an instance of Desc.
Let n be an instance of Int.
Let y be InheritStatus.
Let b be StaticStatus.
Let c be an instance of ComputableExpr.
Let L be an instance of List of m RecordDescs $R_1$ to $R_m$ and their
    corresponding InheritanceMethods $I_1$ to $I_m$ indexed by k.
GetInnerTypeName (r) = RECORD
IsEmpty (GetEnvironment (RecordDesc ( ))) = T
IsEmpty (GetEnvironment (NamedRecordDesc (s))) = T
    A RecordDesc created by inheriting is not empty - as it inherits all
the elements of the source RecordDesc.
IsEmpty (GetEnvironment (InheritRecordDesc (s, L))) = F
GetInUseCount (RecordDesc ( )) = 0
GetInUseCount (NamedRecordDesc (s)) = 0
GetInUseCount (InheritRecordDesc (s, L)) = 0
IsEmpty(GetEnvironment(AddElementToRecordDesc (r, s, d, b, c, y))=F
GetMaxNumberOfSelfElements (RecordDesc ( )) = 0
GetMaxNumberOfSelfElements (NamedRecordDesc (s)) = 0
GetMaxNumberOfSelfElements (InheritRecordDesc (s, L)) = 0
GetMaxNumberOfSelfElements (r) = n IMPLIES
    GetMaxNumberOfSelfElements (AddElementToRecordDesc
                (r, s, d, b, c, y)) = n+1
IsSelfElement (AddElementToRecordDesc (r, s, d, b, c, y), s) = T
GetSelfElementDesc   (AddElementToRecordDesc (r, s, d, b, c, y), s) = d
GetSelfElementStaticStatus
            (AddElementToRecordDesc (r,s,d,b,c,y),s) = b
GetSelfElementDefaultExpr
            (AddElementToRecordDesc (r, s, d, b, c, y), s) = c
GetSelfElementInheritStatus
            (AddElementToRecordDesc (r, s, d, b, c, y), s) = y
GetSelfElementTypeName (r, s) =
        GetInnerTypeName (GetSelfElementDesc (r, s))
Let r1 and r2 be instances of RecordDesc.
IsEqual (r1, r2)  This Equality Axiom is equivalent to the following
conditions being satisfied:
(
GetTypeName (r1) = DESCRIPTOR = GetTypeName (r2);
            AND
GetInnerTypeName (r1) = RECORD = GetInnerTypeName (r2);
            AND
EqualString (GetName (r1), GetName (r2)) = T;
            AND
GetMaxNoOfSelfElements (r1) = GetMaxNoOfSelfElements (r2);
            AND
EqualString (GetSelfElementName (r1, n),
            GetSelfElementName (r2, n)),
                For all 1 ≤ n ≤ GetMaxNoOfSelfElements(r1);
            AND
GetSelfElementInheritStatus(r1, n) =
            GetSelfElementInheritStatus(r2, n)
                For all 1 ≤ n ≤ GetMaxNoOfselfElements (r1);
            AND
GetSelfElementStaticStatus (r1, n) =
            GetSelfElementStaticStatus (r2, n)
                For all 1 ≤ n ≤ GetMaxNumberOfSelfElements (r1);
            AND
(IsEqual
    (GetSelfElementDesc (r1, n), GetSelfElementDesc (r2, n)) = T)
                For all 1 ≤ n ≤ GetMaxNoOfSelfElements (r1);
            AND
GetMaxNoOfBaseDescriptors (r1) =
            GetMaxNoOfBaseDescriptors (r2);
            AND

```
(IsEqual
    (GetBaseDescriptor (r1, n), GetBaseDescriptor (r2, n)) = T)
                For all 1 ≤ n ≤ GetMaxNoOfBaseDescriptors (r1);
                AND
GetBaseInheritanceMethod (r1, n)
                = GetBaseInheritanceMethod (r2, n)
                For all 1 ≤ n ≤ GetMaxNoOfBaseDescriptors (r1)
)
```

Axioms for Inheritance:

The following table contains InheritanceMethod of the base RecordDesc against the InheritStatus of the individual elements of that RecordDesc. According to this table, only those Elements having (InheritStatus=Public) and (InheritanceMethod=Public) of the Descriptor are accessible.

| Inheritance-Method of Parent | InheritStatus of Individual Elements | | |
|---|---|---|---|
|  | Private | Protected | Public |
| Private | Private | Private | Private |
| Protected | Private | Protected | Protected |

-continued

| Inheritance-Method of Parent | InheritStatus of Individual Elements | | |
|---|---|---|---|
|  | Private | Protected | Public |
| Public | Private | Protected | Public |

Let s be the names of all SelfElements in r and the entire base Record Descriptors of r.

```
GetMaxNoOfAccessibleElements (r) =
    Total Number of all those Elements for which
        (GetSelfElementInheritStatus (r, s) = Public)
    For an inheriting RecordDesc, its Maximum Number of Self Elements
    {MaxNumberOfSelfElements} (immediately after its creation) is always
    zero, as specified in the Axiom on GetMaxNumberOfSelfElements (d)
    in the previous section.
    It is possible to add more Elements to the inheriting RecordDesc
    subject to the Precondition that GetInUseCount (RecordDesc) = 0.
    If in the case of Multiple Inheritance (List[RecordDesc, InheritMethod]
    contains more than one RecordDesc) the Names of one or more
    Elements clash in at least two RecordDesc in the List, then they are
    differentiated by appending to it the Name of the RecordDesc where
    they came from. This ensures uniqueness of Names. The uniqueness of
    Names in the inheriting RecordDesc is checked by the Query
    IsSelfElement.
GetInUseCount (r) = n Implies
    GetInUseCount (GetBaseDescriptor(InheritRecordDesc(s, L), k)
        = n + 1,
        for all Record Descriptors r in the List L indexed by k.
    This Axiom ensures that the InUseCount of all the RecordDescs from
    which it inherits (i.e., all the RecordDescs in L) is incremented upon
    creating a RecordDesc by the CreatorInheritRecordDesc (s, L).
}
Preconditions:
{
    Let r be an instance of RecordDesc.
    Let s be an instance of String.
    Let d be an instance of Desc.
    Let n, m, f be an instance of Int.
    Let y be InheritStatus.
    Let b be StaticStatus.
    Let e be an instance of Environment, where the RecordDesc is being
    created.
    Let L be an instance of List of m RecordDesc R₁ to Rₘ and their
    corresponding InheritanceMethods I₁ to Iₘ indexed by k.
    NamedRecordDesc (s)
        Requires:  IsEmpty (s) = F; AND
                   GetTypeName (Rₖ) = DESCRIPTOR; AND
                   IsNamePresent (e, s) = F
    InheritRecordDesc (s, L)
        Requires: For all Rₖ such that 1 ≤ k ≤ m:
                   IsEmpty (s) = F;
```

```
                                AND
                        IsNamePresent (e, s) = F;
                                AND
                        GetInnerTypeName (R_k) = RECORD;
                                AND
                        IsEmpty (GetName (R_k)) = F;
                                AND
                        IsNamePresent (e, GetName (R_k)) = T
        AddElementToRecordDesc (r, s, d, b, c, y)
                Requires:   IsEmpty (s) = F; AND
                            GetInUseCount (r) = 0; AND
                            IsSelfElement (r, s) = F
        GetSelfElementName (r, n)
                Requires:   1 ≤ n ≤ GetMaxNumberOfSelfElements (r)
        GetSelfElementDesc (r, s)
        GetSelfElementTypeName (r, s)
        GetSelfElementInheritStatus (r, s)
        GetSelfElementStaticStatus (r, s)
        GetSelfElementDefaultExpr (r, s)
                The previous five Preconditions all require: IsSelfElement (r, s) = T
        GetAccessibleElementName (r, n)
        GetAccessibleElementDesc (r, n)
                The previous two Preconditions require:
                    1 ≤ n ≤ GetMaxNumberOfAccessibleElements (r)
        Preconditions for Inheritance:
        GetBaseDescriptor (r, n)
        GetBaseInheritanceMethod (r, n)
                The previous two Preconditions for Inheritance require:
                    1 ≤ n ≤ GetMaxNumberOfBaseDescriptors (r)
    }
ADT for the Descriptor for Function
    A Function is defined as having the following properties:
            an Int representing the Maximum Number of Arguments, wherein the Int could
            be zero;
            for each Argument (if any), a valid Descriptor;
            a Return Type (specified by a valid Descriptor).
S = {FunctionDesc}
Ω =   {
            Creators:
            FunctionDesc:           Desc × Int × List[Arguments]
                                        ↪ FunctionDesc
            NamedFunctionDesc:      String × Desc × Int ×
                                        List[Arguments] ↪ FunctionDesc
                The Desc Parameter stands for the Return Type Descriptor of the
                Function.
                The Int Parameter stands for the number of Arguments.
                The List is a standard list of Arguments, such that each Argument
                contains:
                    a Name (every argument may not have it - in which case it will be
                    empty);
                    a Descriptor for the type of the Argument; and
                    a Computable Expression that stands for the default Value of the
                    Argument. (Value is a Type that is described further below. Not
                    every Argument may have it - in which case it is Void.)
                A Block for the FunctionDesc is created here but is not mentioned
                explicitly. Each Block has an Environment. This Block/Environment is
                updated to reflect all the arguments passed by the constructor. This is
                consistent with the description of the ADT of Block/Environment described
                in detail further below.
            Modifiers:
            SetArgumentName:        FunctionDesc × Int ×
                                        String → FunctionDesc
            Queries:
            GetMaxNumberOfArguments: FunctionDesc → Int
            GetNameForArgument:     FunctionDesc × Int ↪ String
            GetDescForArgument:     FunctionDesc × Int ↪ Desc
            GetExpForArgument:      FunctionDesc × Int
                                        ↪ ComputableExpr
            GetReturnTypeDesc:      FunctionDesc → Desc
            GetReturnTypeName:      FunctionDesc → TypeName
            GetBlock:               FunctionDesc → Block
                Block is a Type, described in detail further, that represents the default
                Code for that Function and is available (as default) for every Function.
                It is possible that Block could contain nothing.
    }
Axioms:
    {
            Let f be an instance of FunctionDesc.
            Let s be an instance of String.
```

```
                -continued

Let d be an instance of Desc.
    Let n be an instance of Int.
    Let L be an instance of List of m Arguments A₁ to Aₘ indexed by k.
    GetInnerTypeName (f) = FUNCTION
    GetReturnTypeDesc (FunctionDesc (d, n, L)) = d
    GetReturnTypeDesc (NamedFunctionDesc (s, d, n, L)) = d
    GetReturnTypeName (f) = GetInnerTypeName (GetReturnTypeDesc (f))
    GetMaxNumberOfArguments (FunctionDesc (d, n, L)) = n
    GetMaxNumberOfArguments (NamedFunctionDesc (s, d, n, L)) = n
    GetInUseCount (FunctionDesc (d, n, L)) = 0
    GetInUseCount (NamedFunctionDesc (s, d, n, L)) = 0
    GetNameForArgument (SetArgumentName (f, n, s), n) = s
    GetNameForArgument (FunctionDesc (d, n, L), k) = Aₖ
    GetNameForArgument (NamedFunctionDesc (s, d, n, L), k) = Aₖ
    GetDescForArgument (FunctionDesc (d, n, L), k) = Aₖ
    GetDescForArgument (NamedFunctionDesc (s, d, n, L), k) = Aₖ
    GetExpressionForArgument (FunctionDesc (d, n, L), k) = Aₖ
    GetExpressionForArgument (NamedFunctionDesc (s, d, n, L), k) = Aₖ
        In the previous six Axioms above, Aₖ stands for the Kᵗʰ Argument of the
        List L from which the Name or Descriptor or Computable Expression
        is extracted.
    Let f1 and f2 be instances of FunctionDesc.
    IsEqual (f1, f2)     This Equality Axiom is equivalent to the
    following conditions being satisfied:
    (
        GetTypeName (f1) = DESCRIPTOR = GetTypeName (f2);
                AND
        GetInnerTypeName (f1) = FUNCTION = GetInnerTypeName (f2);
                AND
        IsEqual (GetReturnTypeDesc (f1), GetReturnTypeDesc (f2)) = T;
                AND
    GetMaxNumberOfArguments(f1) = GetMaxNumberOfArguments(f2);
                AND
        (GetMaxNumberOfArguments (f1) = 0;
                OR
            (IsEqual ( GetDescForArgument (f1, n),
                    GetDescForArgument (f2, n)) = T,
                For all 1 ≤ n ≤ GetMaxNumberOfArguments (f)
            )
        )
    )
    }
Preconditions:
    {
    Let f be an instance of Function.
    Let s be an instance of String.
    Let d be an instance of Desc.
    Let n be an instance of Int.
    FunctionDesc (d, n, L)
    NamedFunctionDesc (s, d, n, L)
        The previous two Preconditions require:
                n = size of L; AND
                parameter names, if existing, should be unique.
    GetNameForArgument (f, n)
    GetDescForArgument (f, n)
    GetExpressionForArgument (f, n)
        The previous three Preconditions require:
            1 ≤ n ≤ GetMaxNumberOfArguments (f)
    }
```

The next classes (Types) to be discussed together as a group includes Values, Constants, Locations and Variables. The reason being that these classes are connected intimately, with the binding factors being the Types. As previously noted above, for Basic Computable Types, a Value is constructed from a TypeName and a MetaValue, which can be interpreted by corresponding Types of the Meta Language. For all practical purposes, Value and MetaValue are the same. However, from a theoretical perspective, once a Value is constructed from MetaValue, it is used as a basic Value of the Target Language in the present inventive framework. MetaValue hierarchy of the Meta Language reflects the Value hierarchy of the Target Language.

ADT for Value

Figure 5:
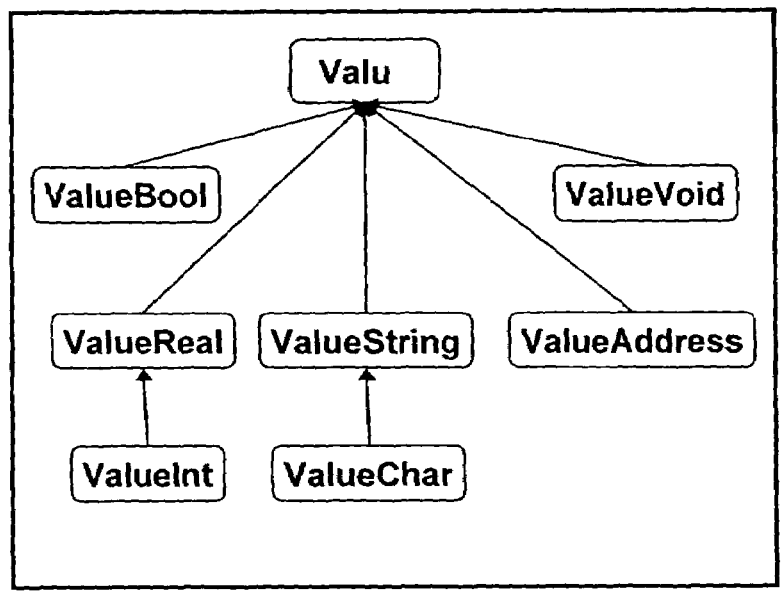
FIG. 5 is an exemplary schematic of the base Value hierarchy identified in the Generic Typed DGC Classes Framework.

Value represents the Runtime Value (RValue). This is in contrast to the Static Value (SValue) that is more applicable to program text of a Type referred to as Command, discussed in detail further below. The Environment knows Values as instances of Basic Computable Types. This set of Values is further classified into Value Integer {ValueInt}, Value Real {ValueReal}, Value Boolean {ValueBool}, Value Character {ValueChar}, Value String {ValueString}, Value Address {ValueAddress}, and Value Void {ValueVoid}, as shown in FIG. 5.

The specific algebraic specification for the base Value is defined as follows:

```
S = {Value}
Ω =   {
          Creators:      None.
            Each individual kind of Value has its own Creators, as specified in their
            respective specific ADTs.
          Modifiers:           None
          Queries:
          IsEqual:             Value × Value ↪Bool
          GetTypeName:         Value →TypeName
          GetInnerTypeName:    Value →TypeName
          GetCompTypeName:     Value →TypeName
          Print:               Value →String
          GetDesc:             Value →BasicCompTypeDesc
            The Creators for each individual kind of Value will ensure the
            appropriate TypeName being set, hence there is no need for a
            SetTypeName Modifier.
      }
Axioms:
      {
          Let v be an instance of Value.
          GetTypeName (v) =_VALUE
          GetInnerTypeName (v) = GetCompTypeName (v)
      }
Preconditions:
      {
          These are basic Preconditions - which will be extended (if required) by each
          of the individual kinds of Value ADTs, as described further below.
          Let v1, v2 be instances of Value.
          IsEqual (v1, v2)     This Axiom requires the following conditions be
                                   satisfied:
                      GetTypeName (v1) = VALUE = GetTypeName (v2); AND
                      GetCompTypeName (v1) = GetCompTypeName (v2)
      }
```

Now the properties associated with each individual kind of Value will be addressed.

```
ADT for Value Boolean
= {ValueBool}
Ω =   {
          Creators:
          CreateValueBool:     MetaValueBool ×
                                   BasicCompTypeDesc ↪ValueBool
          Modifiers:           None
          Queries:
          GetBool:             ValueBool → Bool
      }
Axioms:
      {
          Let v, v1, v2 be instances of ValueBool.
          Let mb be an instance of MetaValueBool.
          Let d be an instance of BasicCompTypeDesc.
          GetInnerTypeName (v) = BOOL
          GetCompTypeName (v) = BOOL
          GetBool (CreateValueBool (mb, d)) = mb
          IsEqual (v1, v2)     This Equality Axiom is equivalent to the following
                                   condition being satisfied:
                      EqualBool (GetBool (v1), GetBool (v2))
          GetDesc (CreateValueBool (mb, d)) = d
      }
Preconditions:
      {
          Let v1, v2 be instances of ValueBool.
          Let mb be an instance of MetaValueBool.
          Let d be an instance of BasicCompTypeDesc.
          IsEqual (v1, v2)
              Requires:
              GetTypeName (v1) = VALUE = GetTypeName (v2); AND
              GetCompTypeName (v1) = BOOL = GetCompTypeName (v2)
          CreateValueBool (mb, d)
```

-continued

```
                Requires: GetCompTypeName (d) = BOOL
        }
ADT for Integer Value
S = {ValueInt}
Ω =     {
            Creators:
            CreateValueInt:     MetaValueInt × BasicCompTypeDesc
                                      ↪ ValueInt
            Modifiers:          None
            Queries:
            GetInt:             ValueInt → Int
            GetReal:            ValueInt → Real
               This is possible because every Int is a Real in the Target Language as
               well as the Meta Language (i.e., a MetaValueInt is also a
               MetaValueReal).
        }
Axioms:
        {
            Let v, v1, v2 be instances of ValueInt.
            Let d be an instance of BasicCompTypeDesc.
            Let mi be an instance of MetaValueInt.
            Let mr be an instance of MetaValueReal.
            GetInnerTypeName (v) = INT
            GetCompTypeName (v) = INT
            GetInt (CreateValueInt (mi)) = mi
            GetReal (CreateValueInt (mi)) = mr
            IsEqual (v1, v2)    This Equality Axiom is equivalent to the following
                                condition being satisfied:
                    EqualInt (GetInt (v1), GetInt (v2))
            GetDesc (CreateValueInt (mi, d)) = d
        }
Preconditions:
        {
            Let v1, v2 be instances of ValueInt.
            Let mi be an instance of MetValueInt.
            Let d be an instance of BasicCompTypeDesc.
            IsEqual (v1, v2)
                Requires:
                    GetTypeName (v1) = VALUE = GetTypeName (v2); AND
                    GetCompTypeName (v1) = INT = GetCompTypeName (v2)
            CreateValueInt (mi, d)
                Requires: GetCompTypeName (d) = INT
        }
ADT for Value Real
S = {ValueReal}
Ω =     {
            Creators:
            CreateValueReal:    MetaValueReal ×
                                BasicCompTypeDesc ↪ValueReal
            Modifiers:          None
            Queries:
            GetIntFloor:        ValueReal → Int
            GetIntCeil:         ValueReal → Int
            GetReal:            ValueReal → Real
        }
Axioms:
        {
            Let v, v1, v2 be instances of ValueReal.
            Let mi, mj be instances of MetaValueInt.
            Let mr be an instance of MetaValueReal.
            Let d be an instance of BasicCompTypeDesc.
            GetInnerTypeName (v) = REAL
            GetCompTypeName (v) = REAL
            GetReal (CreateValueReal (mr)) = mr
            GetIntFloor (CreateValueReal (mr)) = mi
            GetIntCeil (CreateValueReal (mr)) = mj
            GetIntFloor (v) ≦ GetIntCeil (v)
            IsEqual (v1, v2)    This Equality Axiom is equivalent to the following
                                condition being satisfied:
                    EqualReal (GetReal (v1), GetReal (v2))
            GetDesc (CreateValueReal (mr, d)) = d
        }
Preconditions:
        {
            Let v1, v2 be instances of ValueReal.
            Let d be an instance of BasicCompTypeDesc.
            Let mr be an instance of MetaValueReal.
            IsEqual (v1, v2)
                Requires:
```

```
                GetTypeName (v1) = VALUE = GetTypeName (v2);
                            AND
                GetCompTypeName (v1) = REAL;
                            AND
          (GetCompTypeName (v2) = INT; OR GetCompTypeName (v2) = REAL))
          CreateValueReal (mr, d)
                Requires: GetCompTypeName (d) = REAL
     }
```
ADT for Value Character
S = {ValueChar}
Ω =  {
        Creators:
        CreateValueChar:    MetaValueChar ×
                                BasicCompTypeDesc ↪ ValueChar
        Modifiers:          None
        Queries:
        GetChar:            ValueChar → Char
        GetString:          ValueChar → String
           Every Char is a String in the Target Language as well as the Meta
           Language (i.e., a MetaValueChar is also a MetaValueString).
     }
Axioms:
     {
        Let v, v1, v2 be instances of ValueChar.
        Let mc be an instance of MetaValueChar.
        Let ms be an instance of MetaValueString.
        Let d be an instance of BasicCompTypeDesc.
        GetInnerTypeName (v) = CHAR
        GetCompTypeName (v) = CHAR
        GetDesc (CreateValueChar (mc, d)) = d
        GetChar (CreateValueChar (mc)) = mc
        GetString (CreateValueChar (mc)) = ms
        IsEqual (v1, v2)       This Equality Axiom is equivalent to the following
                                condition being satisfied:
                 EqualChar (GetChar (v1), GetChar (v2))
     }
Preconditions:
     {
        Let v1, v2 be instances of ValueChar.
        Let d be an instance of BasicCompTypeDesc.
        Let mc be an instance of MetaValueChar.
        IsEqual (v1, v2)
              Requires:
                 GetTypeName (v1) = VALUE = GetTypeName (v2); AND
                 ( GetCompTypeName (v1) = CHAR = GetCompTypeName (v2) )
        CreateValueChar (mc, d)
              Requires: GetCompTypeName (d) = CHAR
     }
ADT for Value String
S = {ValueString}
Ω =  {
        Creators:
        CreateValueString:  MetaValueString ×
                                BasicCompTypeDesc ↪ ValueString
        Modifiers:          None
        Queries:
        GetString:          ValueString → String
     }
Axioms:
     {
        Let v, v1, v2 be instances of ValueString.
        Let ms be an instance of MetaValueString.
        Let d be an instance of BasicCompTypeDesc.
        GetInnerTypeName (v) = STRING
        GetCompTypeName (v) = STRING
        GetString (CreateValueString (ms)) = ms
        IsEqual (v1, v2)       This Equality Axiom is the equivalent of the following
                                condition being satisfied:
                 EqualString (GetString (v1), GetString (v2))
        GetDesc (CreateValueString (ms, d)) = d
     }
Preconditions:
     {
        Let v1, v2 be instances of Value.
        Let d be an instance of BasicCompTypeDesc.
        Let ms be an instance of MetaValueString.
        IsEqual (v1, v2)
              Requires:
                 GetTypeName (v1) = VALUE = GetTypeName (v2);

-continued

```
                    AND
            GetCompTypeName (v1) = STRING;
                    AND
    (GetCompTypeName (v2) = CHAR; OR GetCompTypeName (v2) =
    STRING)
    CreateValueString (ms, d)
        Requires: GetCompTypeName (d) = STRING
}
```

ADT for Value Address

This definition of ValueAddress fits the notion of Addresses connected with Pointers in the sense that ValueAddress is the Value of TypePointer (apart from being the Value of Address which is a Basic Computable Type).

```
S = {ValueAddress}
Ω = {
        Creators:
        CreateValueAddress:    MetaValueAddress ×
                               BasicCompTypeDesc ↪ ValueAddress
            ValueAddress is constructed in one of two ways viz:
                Explicitly: ValueAddress is constructed from a MetaValueAddress
                whenever there is an Address Constant in the program text; or
                Implicitly: The Environment allocates a new ValueAddress to any
                Variable (or Function) that is created in it.
        Modifiers:      None
        Queries:
        GetAddress:     ValueAddress → Address
        GetInt:         ValueAddress → Int
            Addresses are treated as Integers as a matter of convenience because in
            Hardware and Operating Systems these Addresses are in the Virtual (or
            Real) Address Space (which are always positive integer values). Hence,
            MetaValueAddress also happens to be the same as Int.
    }
Axioms:
    {
        Let v, v1, v2 be instances of ValueAddress.
        Let ma be an instance of MetaValueAddress.
        Let d be an instance of BasicCompTypeDesc.
        GetInnerTypeName (v) = ADDRESS
        GetCompTypeName (v) = ADDRESS
        GetAddress (CreateValueAddress (ma, d)) = ma
        IsEqual (v1, v2)   This Equality Axiom is equivalent to the following
                           condition being satisfied:
            EqualInt (GetInt (GetAddress (v1)), GetInt (GetAddress (V2)))
        GetDesc (CreateValueAddress (ma, d)) = d
    }
Preconditions:
    {
        Let v1, v2 be instances of Value.
        Let d be an instance of BasicCompTypeDesc.
        Let ma be an instance of MetaValueAddress.
        IsEqual (v1, v2)
            Requires:
                GetTypeName (v1) = VALUE = GetTypeName (v2); AND
                GetCompTypeName (v1) = ADDRESS = GetCompTypeName (v2)
        CreateValueAddress (ma, d)
            Requires: GetCompTypeName (d) = ADDRESS
    }
```

ADT for Value Void

```
S = {ValueVoid}
Ω = {
        Creators:
        CreateValueVoid:   BasicCompTypeDesc ↪ ValueVoid
        Modifiers:         None
        Queries:
        GetValueVoid:      ValueVoid → Void
    }
Axioms:
    {
        Let v, v1, v2 be instances of ValueVoid.
        Let d be an instance of BasicCompTypeDesc.
```

```
        GetInnerTypeName (v) = VOID
        GetCompTypeName (v) = VOID
        GetDesc (CreateValueVoid (d)) = d
        GetValueVoid (v) = Null
            Null is a MetaValueVoid and the only one. It represents anything that
            is undefined or not explicitly be given any Value.
            It also represents the default Value of Variables when they are created.
            A Variable having this Value is deemed uninitialized.
        IsEqual (v1, v2) = F
            Void simply means undefined. Hence, this Equality Axiom has been
            selected as expression closest in representation.
    }
Preconditions:
    {
        Let v1, v2 be instances of ValueVoid.
        Let d be an instance of BasicCompTypeDesc.
        IsEqual (v1, v2)
            Requires:
                GetTypeName (v1) = VALUE = GetTypeName (v2); AND
                    GetCompTypeName (v1) = VOID
        CreateValueVoid (d)
            Requires: GetCompTypeName (d) = VOID
    }
```

ADT for Constant

Figure 6:
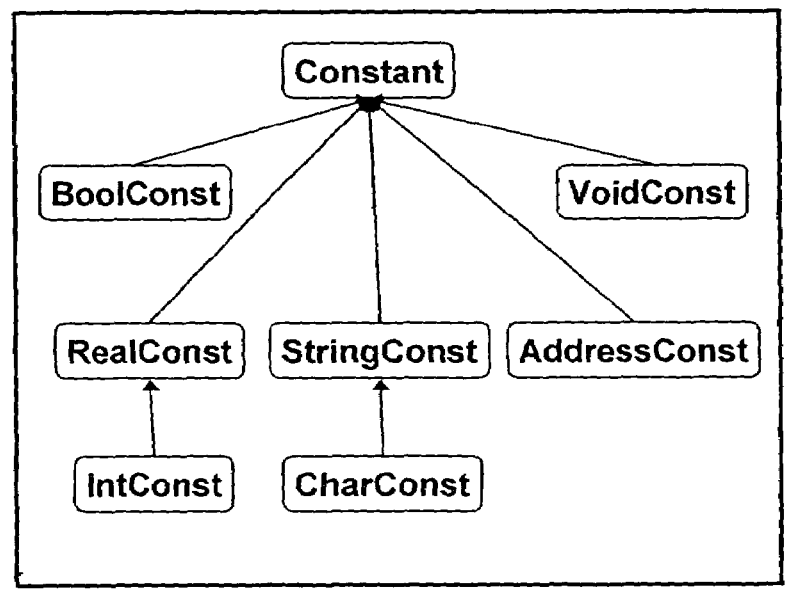
FIG. 6 is an exemplary schematic of the base Constant hierarchy identified in the Generic Typed DGC Classes Framework.

Next, the algebraic specification for the base Constant and its associated individual kinds of Constants (e.g., IntConst, RealConst, BoolConst, CharConst, AddressConst, StringConst, VoidConst) are discussed. A Constant is a binding of a Name (represented by a String) to a Value without any change possible to the Value. In other words, a Constant is a Named Value. In addition, since Value is indicative of Type, Constant is defined as a Named Value of a given Type. FIG. 6 is the hierarchy of the different kinds of Constants.

The properties specified for the base Constant are as follows:

```
S = {IntConstant, RealConst, BoolConst, CharConst, AddressConst, StringConst,
VoidConst}
Ω = {
        Creators:
        CreateNamedConstant:  String × Value → Constant
        CreateConstant:       Value → Constant
        Modifiers:            None
        Queries:
        Evaluate:             Constant → Value
        Print:                Constant → String
        GetTypeName:          Constant → TypeName
        GetInnerTypeName:     Constant → TypeName
        GetCompTypeName:      Constant → TypeName
        GetName:              Constant → String
        IsEqual:              Constant × Constant → Bool
        GetDesc:              Constant → Desc
    }
Axioms:
    {
        Let c, c1, c2 be instances of Constant.
        Let s be an instance of String.
        Let v be an instance of Value.
        Let t be TypeName.
        GetTypeName (c) = CONSTANT
        GetName (CreateNamedConstant (s, v)) = s
        IsEmpty (GetName (CreateNamedConstant (s, v))) = F
        Evaluate (CreateNamedConstant (s, v)) = v
        IsEmpty (GetName (CreateConstant (v))) = T
        Evaluate (CreateConstant (v)) = v
        GetInnerTypeName (c) = GetInnerTypeName (Evaluate (c))
        GetCompTypeName (c) = GetCompTypeName (Evaluate (c))
        IsEqual (c1, c2)      This Equality Axiom is equivalent to the following
                              condition being satisfied:
            IsEqual (Evaluate (c1), Evaluate (c2))
        GetDesc (CreateConstant (v)) = GetDesc (v)
        GetDesc (CreateNamedConstant (s, v)) = GetDesc (v)
    }
Preconditions:
    {
        Let c1, c2 be instances of Constant.
        Let s be an instance of String.
```

-continued

```
        Let e be an instance of Environment where the Constant is to be created.
        IsEqual (c1, c2)
             Requires:
                 GetTypeName (c1) = CONSTANT = GetTypeName (c2);
                              AND
                 GetCompTypeName (c1) = GetCompTypeName (c2)
        CreateNamedConstant (s, v)
             Requires:
                 IsNamePresent (e, s) = F; AND
                 IsEmpty (s) = F
}
```

ADT for Locations

Locations are places in the Environment where the Values are stored. In other words, Locations are containers in the Environment that can contain one of the following:

Location of a Variable of Basic Computable Type or Pointer contains its RValue;

Location of a Variable of Array or Record contains its inner member Elements (of any Type—and so on and so forth until its leaf elements which are any of the Basic Computable Types). It is convenient to formalize this notion of recursive access as—each successive existence of different, but specialized, Environments (for inner Types) until you get to the Values of the Basic Computable Types. This is also done recursively for its contained Elements whenever a Variable of this Type is instantiated;

Location of a Function contains the Block(Code), described further below, of the Function from which a Value can be computed. There are two types of Value viz:

Static Value (SValue) of the Function, i.e., its Block (Code).

Runtime Value (RValue) that is computed at runtime by the Block(Code).

Figure 7:
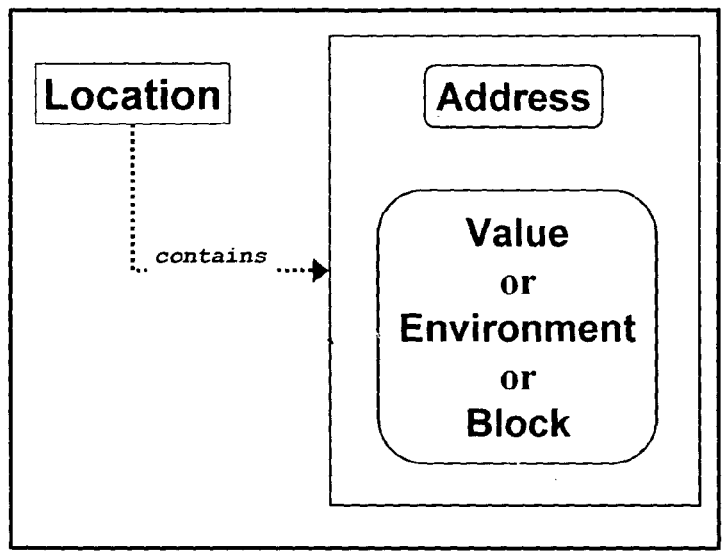
FIG. 7 is an exemplary schematic of the internal structure of Location in accordance with the Generic Typed DGC Classes Framework.
Figure 8:
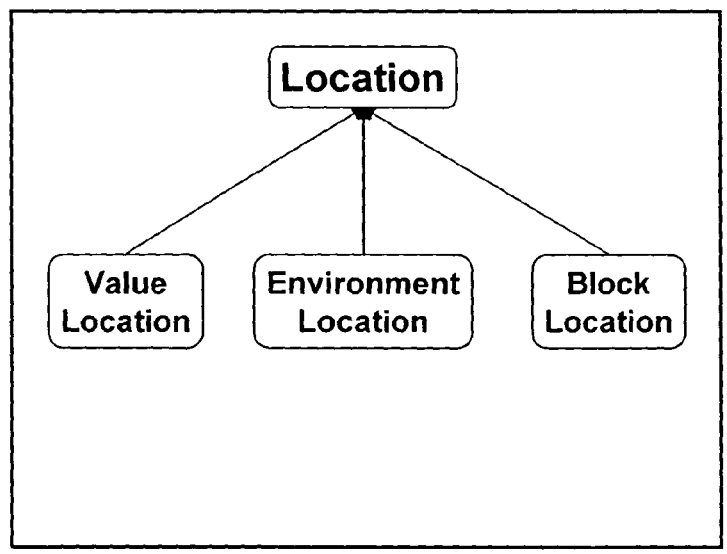
FIG. 8 is an exemplary schematic of the base Location hierarchy identified in the Generic Typed DGC Classes Framework.

Whenever an Environment creates a Location (usually at the time of creation of a new Variable or Function), it assigns a new ValueAddress to the Location. However, this is not explicit in the Creator for Location. The Environment then allocates this Location along with its ValueAddress to the Variable (or Function) being created. Again, this is not explicit in the Creator for Variable (or Function). In compiler terms, a place is assigned to a Variable at a particular Address in the Virtual Address Space, as represented in FIG. 7. The hierarchy for base Location is found in FIG. 8.

The specific algebraic specification for the base Location is as follows:

```
S = {Location}
Ω =   {
             Creators:
                 Once again each kind of Location has its own Creators, as specified in
                 the respective ADT for each kind of Location.
             Modifiers:         None
             Queries:
             GetTypeName        Location → TypeName
             GetInnerTypeName   Location → TypeName
             GetAddress:        Location → ValueAddress
             IsEqual:           Location x Location → Bool
       }
       Axioms:
       {
             Let x, x1, x2 be instances of Location.
             GetTypeName (x) = LOCATION
             IsEqual (x1, x2)   This Equality Axiom is equivalent to the following
                                conditions being satisfied:
             (
                 EqualInt (GetInt (GetAddress (x1)), GetInt (GetAddress (x2)));
                              AND
                 GetTypeName (x1) = LOCATION = GetTypeName (x2);
                              AND
                 GetInnerTypeName (x1) = GetInnerTypeName (x2)
             )
       }
       Preconditions:
       {
             None
       }
       Now, each individual kind of Location will be specified:
ADT for Value Location
S = {ValueLocation}
Ω =   {
             Creators:
             NewValueLocation:  φ → ValueLocation
             Modifiers:
             SetValue:          ValueLocation x Value → ValueLocation
```

-continued

Queries:
      GetValue:    ValueLocation → Value
 }
Axioms:
    {
      Let vl be an instance of ValueLocation.
      Let v be an instance of a Value.
      GetInnerTypeName (vl) = VALUE
      GetCompTypeName (GetValue (NewValueLocation ( )) = VOID
        ValueVoid is the default Value indicating uninitialized Type.
      GetValue (SetValue (vl, v)) = v
    }
Preconditions:
    {
      None
    }
ADT for Environment Location
S = {EnvironmentLocation}
Ω =  {
      Creators:
      NewEnvironmentLocation:   φ → EnvironmentLocation
      Modifiers:
      SetEnvironment:      EnvironmentLocation × Environment
                                               → EnvironmentLocation
      Queries:
      GetEnvironment:     EnvironmentLocation → Environment
 }
Axioms:
    {
      Let el be an instance of any EnvironmentLocation.
      Let e be an instance of any Environment.
      GetInnerTypeName (el) = ENVIRONMENT
      IsEmpty (GetEnvironment (NewEnvironmentLocation ( ))) = T
      GetEnvironment (SetEnvironment (el, e)) = e
    }
Preconditions:
    {
      None
    }
ADT for Block Location
S = {BlockLocation}
Ω =  {
      Creators:
      NewBlockLocation:      φ → BlockLocation
      Modifiers:
      SetBlock:          BlockLocation × Block → BlockLocation
        SetBlock will be required in case of method update, or cloning from
        another object in case of object based approach.
      Queries:
      GetBlock:         BlockLocation → Block
 }
Axioms:
    {
      Let bl be an instance of any BlockLocation.
      Let b be an instance of any Block.
      GetInnerTypeName (bl) = BLOCK
      IsEmpty (GetBlock (NewBlockLocation ( ))) = T
      GetBlock (SetBlock (bl, b)) = b
    }
Preconditions:
    {
      None
    }

ADT for Base Variable

Figure 9:
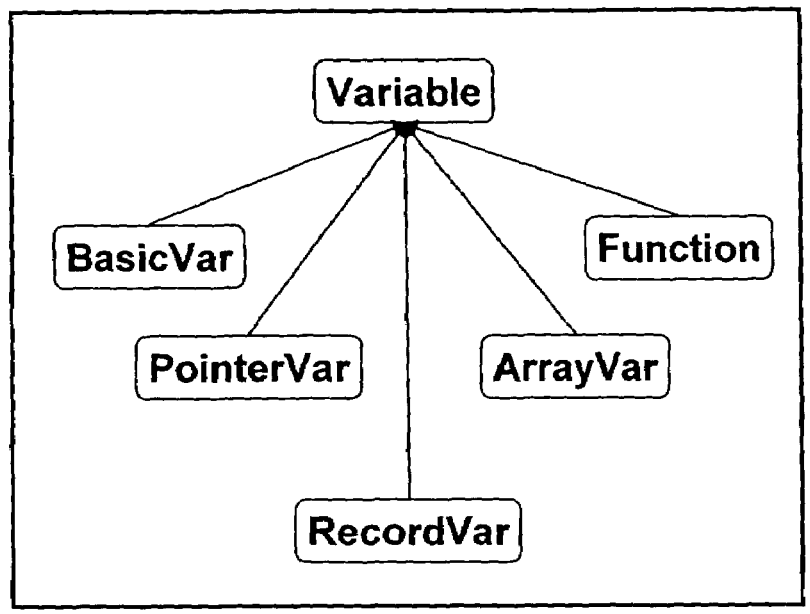
FIG. 9 is an exemplary schematic of the base Variable hierarchy identified in the Generic Typed DGC Classes Framework.

Like Constant, Variable also has a Name-Value binding but, in addition, has a Name-Location binding as well. The binding between Type and Location is achieved through Variable. Unlike that of Constant, the Value of a Variable may be changed. Variables are only applicable for those Types that have a Descriptor, e.g., all Basic Computable Types and the Composite Types (e.g., Pointer, Array, Function, & Record). A hierarchy of the kinds of Variables is shown in FIG. 9. The properties associated with the base Variable are specified in the following ADT:

```
S = {Variable}
Ω = {
        Creators:    None
            Each individual kind of Variable has its own Creators, as specified in
            the respective ADT for each kind of Variable.
            Environment allocates a new Location to the Variable at the time of its
            creation - but this is not explicit in its Creator.
            This Location given to a Variable does not change throughout its
            lifetime. The Variable can therefore be queried for its Location, as well
            as the ValueAddress contained in that Location.
        Modifiers:
        SetAsConstant:      Variable → Variable
            After executing SetAsConstant, the Variable is no longer permitted a
            SetValue, i.e., its Value cannot be changed henceforth.
        Queries:
        IsConstant          Variable → Bool
        GetTypeName:        Variable → TypeName
        GetInnerTypeName:   Variable → TypeName
        GetAddress:         Variable → ValueAddress
        GetLocation:        Variable → Location
        GetName:            Variable → String
        GetDesc:            Variable → Desc
        Print:              Variable → String      (Prints SValue)
    }
Axioms:
    {
        Let v be an instance of Variable.
        GetAddress (v) = GetAddress (GetLocation (v))
        GetTypeName (v) = VARIABLE
    }
Preconditions:
    {
        None
    }
ADTforBasicVariable
S = {BasicVar}
Ω = {
        Creators:
        CreateBasicVariable:       String x BasicCompTypeDesc
                                        ↪BasicVar
            wherein, String represents the Name of the Variable.
            The Creator has to invoke IncrInUseCount on the Descriptor, after
            successful creation of the Variable - so that the Descriptor is protected
            from further modification.
        Modifiers:
        SetValue:                  BasicVar x Value ↪BasicVar
        Queries:
        Evaluate:                  BasicVar → Value (Evaluates RValue)
        GetCompTypeName:           BasicVar → TypeName
    }
Axioms:
    {
        Let s be an instance of String.
        Let d be an instance of BasicCompTypeDesc.
        Let z be an instance of BasicVar.
        Let v be an instance of Value.
        GetInnerTypeName (z) = BASICVAR
        GetCompTypeName (CreateBasicVariable (s, d)) =
                GetCompTypeName (d)
        GetCompTypeName (Evaluate (CreateBasicVariable (s, d)) = VOID
            This Axiom indicates that the Variable is uninitialized after creation.
        IsConstant (CreateBasicVariable (s, d)) = F
        IsConstant (SetAsConstant (z)) = T
        IsEqual (GetCompTypeName (z), GetCompTypeName (Evaluate (z))) = T
        Evaluate (SetValue (z, v)) = v
        Evaluate (z) = GetValue (GetLocation (z))
        SetValue (z, v) = SetValue (GetLocation (z), v)
        GetInnerTypeName (GetLocation (z)) = VALUE
        GetDesc (CreateBasicVariable(s, d)) = d
    }
```

-continued

Preconditions:
{
    Let s be an instance of String.
    Let d be an instance of BasicCompTypeDesc.
    Let z be an instance of BasicVar.
    Let v be an instance of Value.
    Let e be an instance of Environment where the Variable is to be created.
    CreateBasicVariable (s, d)
        Requires:    IsEmpty (s) = F ; AND
                          IsNamePresent (e, s) = F
    SetValue (z, v)
        Requires:
            IsConstant (z) = F ; AND
                (
            If (GetCompTypeName (z) = VOID)
                then
                GetCompTypeName (v) $\in$ { BOOL, INT, REAL,
                        CHAR, STRING, ADDRESS, VOID }
            If (GetCompTypeName (z) = INT)
                then
                GetCompTypeName (v) $\in$ { VOID, INT }
            If (GetCompTypeName (z) = REAL)
                then
                GetCompTypeName (v) $\in$ {VOID, INT, REAL }
            If (GetCompTypeName (z) = CHAR)
                then
                GetCompTypeName (v) $\in$ { VOID, CHAR }
            If (GetCompTypeName (z) = STRING)
                then
                GetCompTypeName (v) $\in$ { VOID, CHAR, STRING }
            If (GetCompTypeName (z) = ADDRESS)
                then
                GetCompTypeName (v) $\in$ { ADDRESS, VOID }
            )
}

ADT for Pointer Variable

A Pointer "points to" or "refers to" an element of any Type. The Address of the "pointed to" Variable is stored as a Value of the Pointer Variable. Thus, a Pointer Variable has ValueAddress as its Value. The fundamental difference between Address (a Basic Computable Type) and the constructed TypePointer is that TypePointer has a "pointed to" Type that refers to the Type of the element being pointed to.

Figure 10:
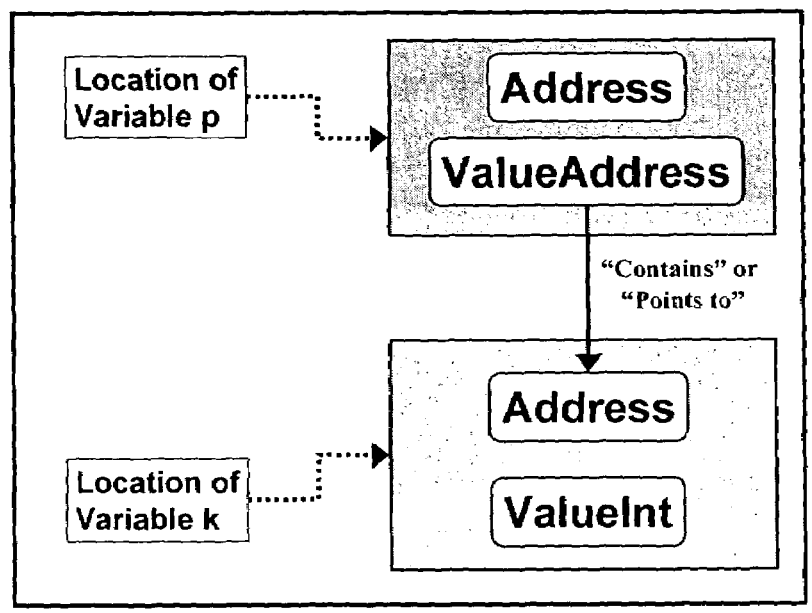
FIG. 10 is an exemplary schematic of the assignment of an Address Value to a Variable of Type Pointer in the Generic Typed DGC Classes Framework.

Assigning an Address to a Variable of TypePointer will be described next. Let p be an instance of a Variable of TypePointer (which is "pointing to" an Int), and let k be an instance of a Variable of Type Int. Now consider the assignment "p=&k". This assignment indicates that the Address contained in the Location of Variable k is stored as the Value of Variable p. FIG. 10 shows a diagrammatic representation of this assignment.

The algebraic specification of the properties associated with the Pointer Variable are defined as follows:

```
S = {PointerVar}
Ω = {
        Creators:
        CreatePointerVariable:    String × PointerDesc ↪ PointerVar
             wherein, String represents the Name of the Variable
        The Creator invokes IncrInUseCount on the Descriptor, after
        successful creation of the Variable, so that the Descriptor is protected
        from further modification.
        Modifiers:
        SetValue:                 PointerVar × Y ↪ PointerVar
             wherein, Y is ValueAddress or ValueVoid
        Queries:
        GetPointedToTypeName:     PointerVar → TypeName
        Evaluate:                 PointerVar → Value (Evaluates RValue)
        GetCompTypeName:          PointerVar → TypeName
    }
Axioms:
    {
        Let s be an instance of String.
        Let d be an instance of PointerDesc.
        Let z be an instance of PointerVar.
        Let v be an instance of Value.
        GetInnerTypeName (z) = POINTER
        IsConstant (CreatePointerVariable (s, d)) = F
        IsConstant (SetAsConstant (z)) = T
```

-continued

```
        GetPointedToTypeName (CreatePointerVar(s, d)) =
                        GetPointedToTypeName (d)
        GetCompTypeName (Evaluate (CreatePointerVariable (s, d)) = VOID
            PointerVar is uninitialized at creation.
        Evaluate (SetValue (z, v)) = v
        Evaluate (z) = GetValue (GetLocation (z))
        SetValue (z, v) = SetValue (GetLocation (z), v)
        GetInnerTypeName (GetLocation (z)) = VALUE
        GetDesc (CreatePointerVariable(s, d)) = d
        GetCompTypeName (CreatePointerVar(s, d)) = GetCompTypeName (d)
    }
Preconditions:
    {
        Let z be an instance of PointerVar.
        Let v be an instance of Value.
        Let d be an instance of PointerDesc.
        Let s be an instance of String.
        Let e be an instance of Environment where the Variable is to be created.
        CreatePointerVariable (s, d)
            Requires:
                    IsEmpty (s) = F; AND
                    IsNamePresent (e, s) = F
        SetValue (z, v)
            Requires: IsConstant (z) = F; AND
            the Precondition is the same as that for Assign of LhsElementary, as
            given in the ADT for LhsElementary which is described below.
    }
ADTforArrayVariable
S = {ArrayVar}
Ω =  {
        Creators:
        CreateArrayVariable:        String × ArrayDesc ↪ArrayVar
            wherein, String represents the Name of the Variable.
            The Creator invokes IncrInUseCount on the Descriptor, after
            successful creation of the Variable, so that the Descriptor is protected
            from further modification.
        Modifiers:    None
        Queries:
        GetArrayedTypeName:    ArrayVar → TypeName
    }
Axioms:
    {
        Let s be an instance of String.
        Let a be an instance of ArrayDesc.
        Let z be an instance of ArrayVar.
        GetInnerTypeName (z) = ARRAY
        IsConstant (CreateArrayVariable (s, a)) = F
        IsConstant (SetAsConstant (z)) = T
        GetArrayedTypeName (CreateArrayVariable (s, a)) =
                        GetArrayedTypeName (a)
        GetDesc (CreateArrayVariable(s, d)) = d
        GetInnerTypeName (GetLocation (z)) = ENVIRONMENT
    }
Preconditions:
    {
        Let d be an instance of ArrayDesc.
        Let s be an instance of String.
        Let e be an instance of Environment where the Variable is to be created.
        CreateArrayVariable (s, d)
            Requires:    IsEmpty (s) = F; AND
                        IsNamePresent (e, s) = F
    }
ADTforRecordVariable
S = {RecordVar}
Ω =  {
        Creators:
        CreateRecordVariable:    String × RecordDesc ↪RecordVar
            wherein, String represents the Name of the Variable.
            The Creator invokes IncrInUseCount on the Descriptor, after
            successful creation of the Variable, so that the Descriptor is protected
            from further modification.
        Modifiers:    None
        Queries:
        GetElementTypeName:    RecordVar × String ↪TypeName
            The String represents Name of the Element whose TypeName is being
            queried. This query is resolved by its corresponding query on the
            RecordDesc.
    }
```

-continued

Axioms:
{
    Let s be an instance of String.
    Let r be an instance of RecordDesc.
    Let z be an instance of RecordVar.
    GetInnerTypeName (z) = RECORD
    IsConstant (CreateRecordVariable (s, r)) = F
    IsConstant (SetAsConstant (z)) = T
    GetDesc (CreateRecordVariable(s, d)) = d
    GetInnerTypeName (GetLocation (z)) = ENVIRONMENT
    GetElementTypeName (z, s) = GetElementTypeName (GetDesc (z), s)
}
Preconditions:
{
    Let d be an instance of RecordDesc.
    Let s be an instance of String.
    Let e be an instance of Environment where the Variable is to be created.
    Let z be an instance of RecordVar.
    CreateRecordVariable (s, d)
        Requires:    IsEmpty (s) = F; AND
                       IsNamePresent (e, s) = F
    GetElementTypeName (z, s)
        Requires:    IsElementOf (GetDesc (z), s) = T
}

ADT for Function

Functions are Variables that have Parameters and Blocks, which can be invoked directly (or as Computable Expressions), as described in detail further below.

ADT for the Base Accessors

Accessors are used to reach (or access) any Variable and/or L cad ns—either via its parent Variables, or indirectly via Locations. Computable Expressions, defined further below, are required to be of any of the Basic Computable Types (or Pointer). However, one may not be able to create Computable Expressions directly from Variables or Functions, because Variables may be of Composite Types, e.g., Arrays or Records, whereas Functions may return Composite Types, e.g., Arrays or Records. Hence, a lookup or conversion table for these composite Variables is required to get to the elementary Variable that can be used to build Computable Expressions. The Accessors (whose Components are Variables) help us perform this lookup. Accessors belong to one of the following classifications or types:

Simple Accessors (e.g., VariableAccessor) that directly access a given Variable or Function in an Environment.

FunctionAccessors built from FunctionVariables and a list of parameters where each parameter is either an Accessor or a ComputableExpression. These Accessors access the Variable holding the result of the evaluation of the Function.

RecordElementAccessors built from a Record and an Element name for that Record. These Accessors access the Element of the Record specified by the Element name.

ArrayElementAccessors built from an Array and a list of ArithmeticExpressions (defined further below) that evaluates to an index into that Array. These Accessors access the Element of the array.

DrefAccessors built from PointerExpressions (defined further below). These Accessors access the Locations pointed to by PointerExpressions.

Figure 11:
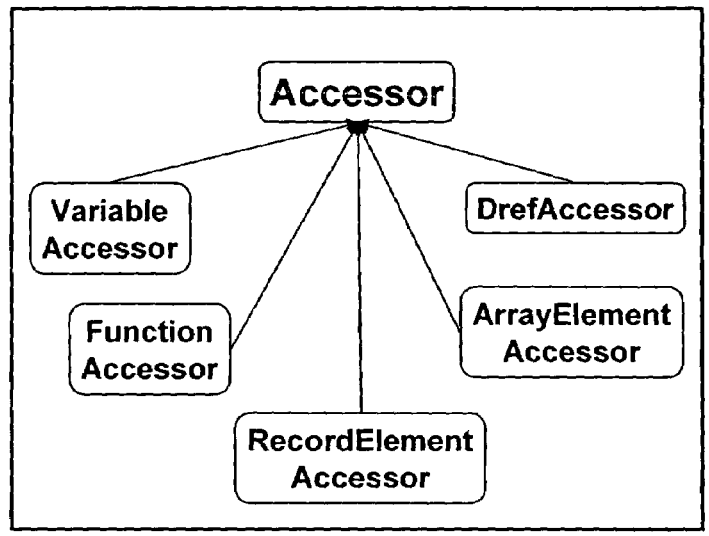
FIG. 11 is an exemplary schematic of the base Accessor hierarchy identified in the Generic Typed DGC Classes Framework.

The base Accessor hierarchy is shown in FIG. 11. The algebraic specification of the properties specified for the base Accessor is as follows:

S = {Accessor}
Ω = {
    Creators:    None
        Each individual kind of Accessors has its own Creators, as specified in
        the respective ADT for each kind of Accessor.
    Modifiers:    None
    Queries:
    GetTypeName:    Accessor → TypeName
    GetInnerTypeName:    Accessor → TypeName
    GetDesc:    Accessor → Desc
    AccessVariable    Accessor ↪ Variable
    AccessLocation:    Accessor → Location
        This method on Accessor is provided to access contents using the
        Dereferencing Accessor {DrefAccessor}. The DrefAccessor directly
        accesses contents of a Location, (bypassing the Variable even if it is
        available).
    IsDrefAccessor:    Accessor → Bool
    Print:    Accessor → String (This accesses the SValue)
}
Axioms:
{
    Let a be an instance of any Accessor.
    GetTypeName (a) = ACCESSOR

```
                }
PreConditions:
        {
                Let a be an instance of Accessor.
                AccessVariable (a)
                        Requires:       IsDrefAccessor (a) = F
                }
ADTforVariableAccessor
S = {VariableAccessor}
Ω = {
                Creators:
                CreateVariableAccessor:   String ↪VariableAccessor
                        wherein, String represents the Name of the Variable.
                Modifiers:      None
                Queries:        None
        }
Axioms:
        {
                Let s be an instance of String, representing the Name of the Variable.
                Let a be an instance of VariableAccessor.
                Let e be an instance of Environment where the Accessor is to be created.
                GetInnerTypeName (a) = VARIABLE
                IsDrefAccessor (CreateVariableAccessor (s)) = F
                AccessVariable (CreateVariableAccessor (s)) = GetVariable (e, s)
                AccessLocation(CreateVariableAccessor(s)) =
                                        GetLocation (GetVariable (e, s))
                GetDesc (a) = GetDesc (AccessVariable (a))
        }
PreConditions:
        {
                Let s be an instance of String, representing the Name of the Variable.
                Let e be an instance of Environment where the Accessor is to be created.
                CreateVariableAccessor (s)
                        Requires:
                                IsVariablePresent (e, s) = T; AND
                                IsAccessible (e, s) = T
        }
```

ADT for Function Accessor

The Creator uses an Accessor and a ParameterList as one of its arguments. Each parameter of the ParameterList is either a CoinputableExpr or an Accessor. (ParameterList is a standard List and thus will not be axiomatized further).

```
S = {FunctionAccessor}
Ω = {
                Creators:
                CreateFunctionAccessor:     Accessor × ParameterList
                                                ↪FunctionAccessor
                        A Function can be an element of a Record or Array, or even pointed to
                        by a Pointer. Therefore, first an Accessor will have to be created for the
                        name of the function. This Accessor, together with the ParameterList
                        together create the FunctionAccessor.
                        The Expression f(a,b,c) creates a VariableAccess r for f that is passed
                        as Access r to CreateFunctionAccessor with the Parameter List as
                        the second parameter
                Modifiers:              None
                Queries:
                GetParameterList:       FunctionAccessor → ParameterList
        }
Axioms:
        {
                Let a be an instance of Accessor.
                Let f be an instance of FunctionAccessor.
                Let e be an instance of Environment.
                Let L be a ParameterList.
                GetInnerTypeName (a) = VARIABLE
                IsDrefAccessor (CreateFunctionAccessor (a, L)) = F
                GetParameterList (CreateFunctionAccessor (a, L)) = L
                AccessVariable (CreateFunctionAccessor (a, L)) = AccessVariable (a)
                AccessLocation (CreateFunctionAccessor (a, L)) =
                        GetLocation (GetVariable (GetEnvironment (GetLocation
```

```
                    (AccessVariable (a)) )), s)
            wherein, s is GetName (AccessVariable (a))
        GetDesc (f) = GetReturnTypeDesc (GetDesc (AccessVariable (f)))
    }
PreConditions:
    {
        Let a be an instance of Accessor.
        Let e be an instance of Environment where the Accessor is to be created.
        CreateFunctionAccessor (a, L)
            Requires: GetInnerTypeName (GetDesc (a)) = FUNCTION
            Each parameter in the ParameterList (L) is matched for its Type
            with the corresponding Arguments in the Descriptor for the
            Function, subject to the presence of Arguments.
    }
ADTforRecordElementAccessor
S = {RecordElementAccessor}
Ω = {
        Creators:
        CreateRecordElementAccessor: Accessor × String
                                          ↪RecordElementAccessor
            Suppose a Record Variable named R contains two Integer elements,
            e1 and e2. The Expression R.e1 creates a VariableAccessor for R
            that is passed as Accessor to CreateRecordElementAccessor with
            the String e1 as the second parameter, while R.e2 creates the
            VariableAccessor for R (if not already available - because the
            occurrence of R.e2 is independent of the occurrence of R.e1 and vice-
            versa) and is passed as a parameter with the String e2.
        Modifiers:      None
        Queries:        None
    }
Axioms:
    {
        Let s be an instance of String, representing the Name of the Element.
        Let a be an instance of RecordAccessor.
        GetInnerTypeName (a) = VARIABLE
        IsDrefAccessor (CreateRecordElementAccessor (a, s)) = F
        AccessVariable (CreateRecordElementAccessor (a, s)) =
            GetVariable (GetEnvironment (AccessLocation (a)), s)
        AccessLocation (CreateRecordElementAccessor (a, s)) =
            GetLocation (GetVariable (GetEnvironment (AccessLocation (a)), s))
        GetDesc (CreateRecordElementAccessor (a, s)) =
                GetElementDesc (GetDesc (a), s)
    }
PreConditions:
    {
        Let s be an instance of String, representing the Name of the Element.
        Let a be an instance of Accessor.
        CreateRecordElementAccessor (a, s)
            Requires:   GetInnerTypeName (GetDesc (a)) = RECORD; and
                        IsAccessible (GetDesc (a), s) = T
    }
ADTforArrayElementAccessor
S = {ArrayElementAccessor}
Ω = {
        Creators:
        CreateArrayElementAccessor: Accessor × List [ArithmeticExpr]↪
                                        ArrayElementAccessor
            An Array Variable has as many Indexes into it as the number of
            Dimensions for accessing any of its Elements.
            Let Y be an array Variable of Real that has M Dimensions, wherein the
            Size for each Dimension is $(S_1, S_2, \ldots S_M)$ respectively.
            The Expression to Index into Y for an Element is $Y[E_1, E_2, \ldots E_M]$,
            where each $E_k$, $(1 \leq k \leq M)$, evaluates to an integer between 1 and $S_M$.
            The expression $Y[E_1, E_2, \ldots E_M]$ creates a VariableAccessor for Y that is
            passed as Accessor to CreateArrayElementAccessor, with $[E_1, E_2, \ldots
            E_M]$ as the List of ArithmeticExpr.
        Modifiers:      None
        Queries:        None
    }
Axioms:
    {
        Let ae be an instance of ArithmeticExpr.
        Let a be an instance of Accessor.
        Let L be a List [ArithmeticExpr].
        GetInnerTypeName (a) = VARIABLE
        IsDrefAccessor (CreateArrayElementAccessor (a, L)) = F
        AccessVariable (CreateArrayElementAccessor (a, L)) =
            GetVariable (GetEnvironment (AccessLocation (a)), L)
        GetDesc (CreateArrayElementAccessor (a, L)) =
```

```
                GetArrayedTypeDesc (GetDesc (a))
        }
PreConditions:
        {
                Let a be an instance of Accessor.
                Let L be a List [ArithmeticExpr].
                CreateArrayElementAccessor (a, L)
                        Requires:   GetInnerTypeName (GetDesc (a)) = ARRAY; AND
                                    EqualInt (n, GetMaxDimension (GetDesc (a))
                                (Where n is the number of Expressions in L)
        }
ADTforDereferencingAccessor
        Dereferencing Accessor {DrefAccesor} accesses a value pointed to by a pointer.
S = {DrefAccessor}
Ω = {
                Creators:
                CreateDrefAccessor:         PointerExpr → DrefAccessor
                Modifiers:      None
                Queries:        None
        }
Axioms:
        {
                Let p be an instance of PointerExpr.
                Let a be an instance of DrefAccessor.
                GetInnerTypeName (a) = LOCATION
                IsDrefAccessor (CreateDrefAccessor (p)) = T
                AccessLocation (CreateDrefAccessor (p)) =
                        GetLocationForAddress (Evaluate (p))
                GetDesc (CreateDrefAccessor (p)) =
                        GetPointedToTypeDesc (GetDesc (p))
        }
PreConditions:
        {
                Let p be an instance of PointerExpr.
                CreateDrefAccessor (p)
                        Requires:   GetCompTypeName (Evaluate (p)) IS NOT VOID
        }
```

ADT for the Base Computable Expressions

Figure 12:
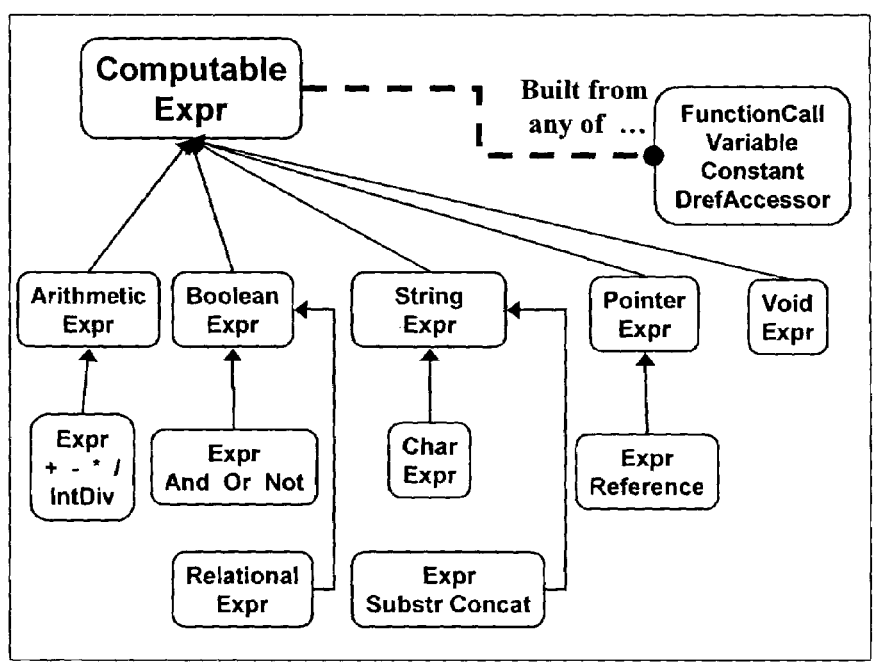
FIG. 12 is an exemplary schematic of the base Computable Expressions hierarchy identified in the Generic Typed DGC Classes Framework.

Computable Expressions are Expressions that compute Values of Basic Computable Types. FIG. 12 shows the hierarchy of base Computable Expressions. The algebraic specification of the properties specified for the base Computable Expressions is as follows:

```
S = {ComputableExpr}
Ω =     {
                Creators: None.
                        Each individual kind of Computable Expression has its
                        own Creators, as specified in the respective ADT for each kind of
                        Computable Expression.
                Modifiers: None
                Queries:
                GetTypeName:            ComputableExpr → TypeName
                GetInnerTypeName:       ComputableExpr → TypeName
                GetCompTypeName:        ComputableExpr → TypeName
                Evaluate:               ComputableExpr → Value (Evaluates RValue)
                Print:                  ComputableExpr → String (Prints SValue)
                GetDesc:                ComputableExpr → BasicCompTypeDesc
        }
Axioms:
        {
                Let e be an instance of ComputableExpr.
                GetTypeName (e) = COMPUTABLE_EXPR
        }
Preconditions:
        {
                None
        }
ADTforArithmeticExpression
S = { ArithmeticExpr }
Ω = {
                Creators:
                CreateArithmeticVariableExpression:     Accessor  ArithmeticExpr
                CreateArithmeticConstantExpression:     X → ArithmeticExpr
                        wherein, X is of IntConst or RealConst
```

```
        CreateArithmeticFunctionCallExpression:    FunctionAccessor
                                                    ArithmeticExpr
        CreateArithmeticDrefExpression:            DrefAccessor
                                                    ArithmeticExpr
    ArithmeticOperatorExpressions:
    CreateAddExpression:                           ArithmeticExpr × ArithmeticExpr →
                                                    ArithmeticExpr
    CreateSubtractExpression:                      ArithmeticExpr × ArithmeticExpr →
                                                    ArithmeticExpr
    CreateMultiplyExpression:                      ArithmeticExpr × ArithmeticExpr →
                                                    ArithmeticExpr
    CreateDivideExpression:                        ArithmeticExpr × ArithmeticExpr
                                                    ArithmeticExpr
    CreateIntDivideExpression:                     ArithmeticExpr × ArithmeticExpr
                                                    ArithmeticExpr
        This last Arithmetic Operator Expression above is required because
        Int Division is allowed as a special case, and it truncates the result if
        the first Int is not divisible by the second Int.
    Modifiers:    None
    Queries:
    GetSuperTypeName:    ArithmeticExpr → TypeName
        This is a private function for this ADT - that is used by
        GetComputableTypeName for returning TypeName according to
        the following table - where Type represents Type of the constituent
        ArithmeticExpr. For unary ArithmeticExpr, it is assumed that the
        Type of the constituent ArithmeticExpr will suffice.
        TypeName      TypeName      SuperTypeName
        Int           Int           Int
        Int           Real          Real
        Real          Int           Real
        Real          Real          Real
    }
Axioms:
    {
        Let a, a1, a2 be instances of ArithmeticExpr.
        Let v be an instance of Accessor.
        Let c be an instance of Constant.
        Let f be an instance of FunctionAccessor.
        Let d be an instance of DrefAccessor.
        GetInnerTypeName (a) = ARITHMETIC
        GetDesc (CreateArithmeticVariableExpression (v)) = GetDesc (v)
        GetDesc (CreateArithmeticFunctionExpression (f)) = GetDesc (f)
        GetDesc (CreateArithmeticConstantExpression (cc)) = GetDesc (c)
        GetDesc (CreateArithmeticDrefExpression (d)) = GetDesc (d)
        GetCompTypeName (a) = GetCompTypeName (GetDesc (a))
        GetCompTypeName (CreateDivideExpr (a1, a2)) = REAL
        GetCompTypeName (CreateIntDivideExpr (a1, a2)) = INT
    }
PreConditions:
    {
        Let a, a1, a2 be instances of ArithmeticExpr.
        Let v be an instance of VariableAccessor.
        Let f be an instance of FunctionAccessor.
        Let d be an instance of DrefAccessor.
        CreateDivideExpression (a1, a2)
            Requires:    Evaluate (a2) ≠ 0
        CreateIntDivideExpression (a1, a2)
            Requires:    Evaluate (a2) ≠ 0; and
                         GetCompTypeName (a1) = INT; AND
                         GetCompTypeName (a2) = INT
        CreateArithmeticVariableExpression (v)
            Requires:
                GetInnerTypeName (v) = VARIABLE;
                        AND
                GetInnerTypeName (GetDesc (v)) = BASICCOMPTYPE;
                        AND
                (GetCompTypeName(GetDesc (v)) = INT;
                        OR
                GetCompTypeName (GetDesc (v)) = REAL)
        CreateArithmeticFunctionCallExpression (f)
            Requires:
                GetInnerTypeName (GetDesc (f)) = BASICCOMPTYPE
                        AND
                ( GetCompTypeName (GetDesc (f)) = INT
                        OR
                GetCompTypeName (GetDesc (f)) = REAL )
        CreateArithmeticDrefExpression (d)
            Requires:
                GetInnerTypeName (d) = LOCATION
```

```
                        AND
            GetInnerTypeName (GetDesc (d)) = BASICCOMPTYPE
                        AND
            (GetCompTypeName (GetDesc (d)) = INT
                        OR
            GetCompTypeName (GetDesc (d)) = REAL)
    }
ADTforBooleanExpression
S = {BooleanExpr}
Ω = {
        Creators:
        CreateBooleanVariableExpression:       VariableAccessor
                                                   BooleanExpr
        CreateBooleanConstantExpression:       BoolConst → BooleanExpr
        CreateBooleanFunctionCallExpression:   FunctionAccessor
                                                   BooleanExpr
        CreateBooleanDrefExpression:           DrefAccessor
                                                   BooleanExpr
        CreateIsEqualArithExpr:                ArithmeticExpr ×
                                                   ArithmeticExpr → BooleanExpr
        CreateIsEqualBoolExpr:                 BooleanExpr ×
                                                   BooleanExpr → BooleanExpr
        CreateIsEqualCharExpr:                 CharExpr × CharExpr → BooleanExpr
        CreateIsEqualStringExpr:               StringExpr × StringExpr → BooleanExpr
        CreateIsEqualPointerExpr:              PointerExpr × PointerExpr → BooleanExpr
        CreateIsLessThanArithExpr:             ArithmeticExpr × ArithmeticExpr →
                                                   BooleanExpr
        CreateIsLessThanBoolExpr:              BooleanExpr × BooleanExpr →
                                                   BooleanExpr
        CreateIsLessThanCharExpr:              CharExpr × CharExpr →
                                                   BooleanExpr
        CreateIsLessThanStringExpr:            StringExpr × StringExpr →
                                                   BooleanExpr
        BooleanOperatorExpressions:
        CreateAndExpression:                   BooleanExpr × BooleanExpr →
                                                   BooleanExpr
        CreateOrExpression:                    BooleanExpr × Bo l anExpr →
                                                   BooleanExpr
        CreateXOrExpression:                   BooleanExpr × BooleanExpr →
                                                   BooleanExpr
        CreateNotExpression:                   BooleanExpr → BooleanExpr
        Modifiers:    None
        Queries:      None
}
Axioms:
    {
        Let b be an instance of BooleanExpr.
        Let a be an instance of Accessor.
        Let c be an instance of Constant.
        Let f be an instance of FunctionAccessor.
        Let d be an instance of DrefAccessor.
        GetInnerTypeName (b) = BOOL
        GetCompTypeName (b) = BOOL
        GetDesc (CreateBooleanVariableExpression (a)) = GetDesc (a)
        GetDesc (CreateBooleanFunctionExpression (f)) = GetDesc (f)
        GetDesc (CreateBooleanConstantExpression (c)) = GetDesc (c)
        GetDesc (CreateBooleanDrefExpression (d)) = GetDesc (d)
    }
PreConditions:
    {
        Let b be an instance of BooleanExpr.
        Let a be an instance of Accessor.
        Let f be an instance of FunctionAccessor.
        Let d be an instance of DrefAccessor.
        CreateBooleanVariableExpression (a)
            Requires:
                GetInnerTypeName (a) = VARIABLE;
                        AND
                GetInnerTypeName (GetDesc (a)) = BASICCOMPTYPE;
                        AND
                GetCompTypeName (GetDesc (a)) = BOOL
        CreateBooleanFunctionCallExpression (f)
            Requires:
                GetInnerTypeName (GetDesc (f)) = BASICCOMPTYPE;
                        AND
                GetCompTypeName (GetDesc (f)) = BOOL
        CreateBooleanDrefExpression (d)
            Requires:
                GetInnerTypeName (d) = LOCATION;
```

```
                        AND
            GetInnerTypeName (GetDesc (d)) = BASICCOMPTYPE;
                        AND
            GetCompTypeName (GetDesc (d)) = BOOL
    }
ADTforCharacterExpression
S = {CharExpr}
Ω = {
        Creators:
        CreateCharacterVariableExpression:      Accessor    CharExpr
        CreateCharacterConstantExpression:      CharConst →
                                                    CharExpr
        CreateCharacterFunctionCallExpression:  FunctionAccessor
                                                    CharExpr
        CreateCharacterDrefExpression:          DrefAccessor
                                                    CharExpr
        OperatorExpressions:
        CreatePredExpression:                   CharExpr → CharExpr
        CreateSuccExpression:                   CharExpr → CharExpr
        Modifiers:  None
        Queries:    None
    }
Axioms:
    {
        Let c be an instance of CharExpr.
        Let a be an instance of Accessor.
        Let $c_1$ be an instance of Constant.
        Let f be an instance of FunctionAccessor.
        Let d be an instance of DrefAccessor.
        GetInnerTypeName (c) = CHAR
        GetCompTypeName (c) = CHAR
        GetDesc (CreateCharacterVariableExpression (a)) = GetDesc (a)
        GetDesc (CreateCharacterFunctionExpression (f)) = GetDesc (f)
        GetDesc (CreateCharacterConstantExpression ($c_1$)) = GetDesc ($c_1$)
        GetDesc (CreateCharacterDrefExpression (d)) = GetDesc (d)
    }
PreConditions:
    {
        Let b be an instance of BooleanExpr.
        Let a be an instance of Accessor.
        Let f be an instance of FunctionAccessor.
        Let d be an instance of DrefAccessor.
        CreateCharacterVariableExpression (a)
            Requires:
                GetInnerTypeName (a) = VARIABLE;
                        AND
                GetInnerTypeName (GetDesc (a)) = BASICCOMPTYPE;
                        AND
                GetCompTypeName (GetDesc (a)) = CHAR
        CreateCharacterFunctionCallExpression (f)
            Requires:
                GetInnerTypeName (GetDesc (f)) = BASICCOMPTYPE;
                        AND
                GetCompTypeName (GetDesc (f)) = CHAR
        CreateCharacterDrefExpression (d)
            Requires:
                GetInnerTypeName (d) = LOCATION;
                        AND
                GetInnerTypeName (GetDesc (d)) = BASICCOMPTYPE;
                        AND
                GetCompTypeName (GetDesc (d)) = CHAR
    }
ADTforStringExpression
S = {StringExpr}
Ω = {
        Creators:
        CreateStringVariableExpression: Accessor    StringExpr
        CreateStringConstantExpression: X → StringExpr
                wherein, X is CharConst or StringConst
        CreateStringCharExpression:             CharExpr → StringExpr
        CreateStringFunctionCallExpression:     FunctionAccessor
                                                    StringExpr
        CreateStringDrefExpression:             DrefAccessor    StringExpr
        OperatorExpressions:
        CreateStringConcatExpr:         StringExpr × StringExpr →
                                                    StringExpr
        CreateSubstringExpr:            StringExpr × ArithmeticExpr ×
                                                    ArithmeticExpr → StringExpr
                wherein, the first ArithmeticExpr is the Position of the start of the
```

-continued

SubString within the String, and the second ArithmeticExpr is the
        Length of the Substring.
        <u>Modifiers:</u>   None
        <u>Queries:</u>    None
   }
<u>Axioms:</u>
   {
        Let s be an instance of StringExpr.
        Let k be a CharExpr.
        Let a be an instance of Accessor.
        Let c be an instance of Constant.
        Let f be an instance of FunctionAccessor.
        Let d be an instance of DrefAccessor.
        GetInnerTypeName (s) = STRING
        GetCompTypeName (s) = STRING
        GetDesc (CreateStringVariableExpression (a)) = GetDesc (a)
        GetDesc (CreateStringFunctionExpression (f)) = GetDesc (f)
        GetDesc (CreateStringConstantExpression (c)) = GetDesc (c)
        GetDesc (CreateStringDrefExpression (d)) = GetDesc (d)
            Every Char is a String therefore GetDesc converts any input
        Descriptors of CompTypeName = CHAR to Descriptors of
        CompTypeName = STRING.
   }
<u>PreConditions:</u>
   {
        Let s be an instance of StringExpr.
        Let a be an instance of Accessor.
        Let f be an instance of FunctionAccessor.
        Let d be an instance of DrefAccessor.
        CreateStringVariableExpression (a)
            Requires:
                GetInnerTypeName (a) = VARIABLE;
                    AND
                GetInnerTypeName (GetDesc (a)) = BASICCOMPTYPE;
                    AND
                GetCompTypeName (GetDesc (a)) = STRING
        CreateStringFunctionCallExpression (f)
            Requires:
                GetInnerTypeName (GetDesc (f)) = BASICCOMPTYPE;
                    AND
                GetCompTypeName (GetDesc (f)) = STRING
        CreateStringDrefExpression (d)
            Requires:
                GetInnerTypeName (d) = LOCATION;
                    AND
                GetInnerTypeName (GetDesc (d)) = BASICCOMPTYPE;
                    AND
                GetCompTypeName (GetDesc (d)) = STRING
   }
<u>ADTforPointerExpression</u>
S = {PointerExpr}
Ω = {
        <u>Creators:</u>
        CreatePointerVariableExpression:        Accessor
                                                        PointerExpr
        CreatePointerFunctionCallExpression:    FunctionAccessor
                                                        PointerExpr
        CreatePointerReferenceExpression:       Accessor → PointerExpr
        CreatePointerDrefExpression:                DrefAccessor → PointerExpr
        <u>OperatorExpressions:</u>
        CreatePointerAdvanceExpression:        PointerExpr x ArithmeticExpr
                                                        PointerExpr
            wherein, the ArithmeticExpr is the number by which the Value of the
            PointerExpr is to be advanced (or incremented).
        <u>Modifiers:</u>      None
        <u>Queries:</u>
        GetInnerTypeDesc: PointerExpr → Descriptor
            Since Pointer is also a BasicCompType, the GetDesc( ) query on
            PointerExpression will return a BasicCompTypeDesc, with
            CompTypeName as ADDRESS.
            However, for type checking, the inner type of the Pointer is required.
            For Example, a Pointer to Int, can only be assigned to a variable of
            type Pointer to Int.
            A new query GetInnerTypeDesc( ) is introduced for type checking in
            assignments which returns the inner (pointed to) type of the pointer.
   }
<u>Axioms:</u>
   {
        Let p be an instance of PointerExpr.

-continued

```
        Let a be an instance of Accessor.
        Let f be an instance of FunctionAccessor.
        Let d be an instance of DrefAccessor.
        GetInnerTypeName (c) = POINTER
        GetInnerTypeDesc (CreatePointerVariableExpression (a)) = GetDesc (a)
        GetInnerTypeDesc (CreatePointerFunctionExpression (f)) = GetDesc (f)
        GetInnerTypeDesc (CreatePointerReferenceExpression (a)) =
                                        GetDesc (a)
        GetInnerTypeDesc (CreatePointerDrefExpression (d) = GetDesc (d)
        GetCompTypeName (p) = ADDRESS
    }
PreConditions:
    {
        Let f be an instance of FunctionAccessor.
        Let a be an instance of any Accessor.
        Let d be an instance of DrefAccessor.
        CreatePointerReferenceExpression (a)
            Requires:   IsDrefAccessor (a) = F
        CreatePointerVariableExpression (a)
            Requires:
                GetTypeName (GetDesc (a)) = DESCRIPTOR;
                                AND
                GetInnerTypeName (GetDesc (a)) = POINTER;
                                AND
                GetInnerTypeName (a) = VARIABLE
        CreatePointerFunctionCallExpression (f)
            Requires:
                GetInnerTypeName (GetDesc (f)) = POINTER
        CreatePointerDrefExpression (d)
            Requires:
                GetInnerTypeName (GetDesc (d)) = POINTER;
                                AND
                GetInnerTypeName (d) = LOCATION
    }
```

ADT for Void Expression

Since Void is also a BasicCompType, the Getesc( ) query on VoidExpression will return a BasicCompTypeDesc, with CompTypeName as VOID. VoidExpressions are required to incorporate Dynamic Typing capabilities in the Generic Typed DGC Classes Framework, as well as to create meaningful expressions of Procedure Calls, which do not have a return Value.

```
S = {VoidExpr}
Ω = {
        Creators:
        CreateVoidVariableExpression:       Accessor ↪ VoidExpr
        CreateVoidConstantExpression:       VoidConst → VoidExpr
        CreateVoidFunctionCallExpression:   FunctionAccessor↪
                                                VoidExpr
        CreateVoidDrefExpression:           DrefAccessor → VoidExpr
        OperatorExpressions:    None
        Modifiers:              None
        Queries:                None
    }
Axioms:
    {
        Let v be an instance of VoidExpr.
        Let a be an instance of Accessor.
        Let f be an instance of FunctionAccessor.
        Let d be an instance of DrefAccessor.
        GetInnerTypeName (GetDesc (v)) = BASICCOMPTYPE
        GetCompTypeName (GetDesc (v)) = VOID
    }
PreConditions:
    {
        Let a be an instance of any Accessor.
        Let d be an instance of DrefAccessor.
        Let f be an instance of FunctionAccessor.
        Let v be an instance of VariableAccessor.
        CreateVoidFunctionCallExpression (f)
            Requires:
                GetInnerTypeName (GetDesc (f)) = BASICCOMPTYPE;
                                AND
                GetCompTypeName (GetDesc (f)) = VOID
        CreateVoidVariableExpression (v)
```

```
                Requires:
                        GetInnerTypeName (GetDesc (v)) = BASICCOMPTYPE;
                                AND
                        GetCompTypeName (GetDesc (v)) = VOID
                CreateVoidDrefExpression (d)
                        Requires:
                                GetInnerTypeName (GetDesc (d)) = BASICCOMPTYPE;
                                        AND
                                GetCompTypeName (GetDesc (d)) = VOID
        }
```

ADT for Base Left Hand Side Identifier

Figure 13:
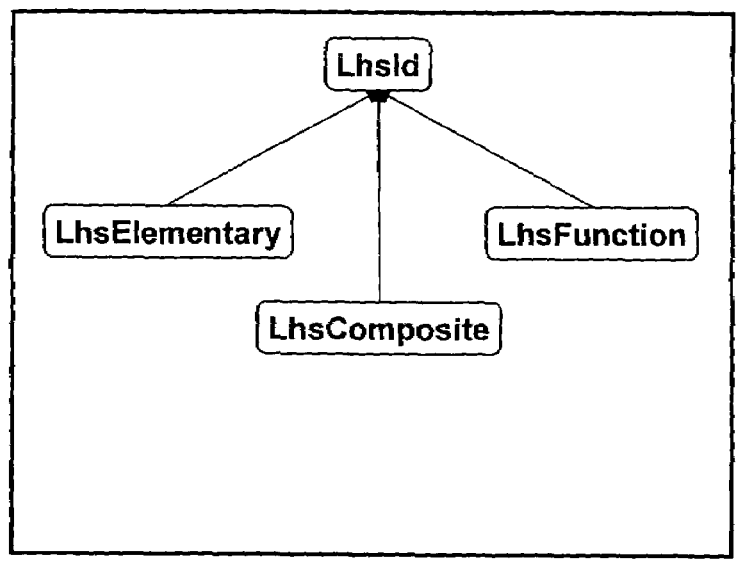
FIG. 13 is an exemplary schematic of the base Left Hand Side Identifier hierarchy identified in the Generic Typed DGC Classes Framework.

The Left-Hand-Side-identifier (LhsId), found only on the Left-Hand-Side of an Assignment statement, is the only thing that performs a SetValue on Variable or Location thereby causing a change of State. LhsId uses the Accessor to get to a Variable/Location. The LhsId hierarchy is found in FIG. 13.

LhsId is used for the following purposes:

In its simplest form, LhsId contains a Variable (or a Location of Variable) of Basic Computable Type or Pointer. It performs a SetValue on this Variable, thereby changing State;

LhsId may contain a Variable of Record or Array. In this case, LhsId iterates through the Variable and performs a SetValue (for Deep Copy) on the individual elements of the Array or Record. Deep Copy is the term used for copying of Composite Variables, e.g., Array or Record, that contain Element Variables. That is, Deep Copy implies the copying of corresponding Element Variables of that Composite Variable. If the Element Variables are Composite Variables themselves, then Deep Copying involves recursively copying their elements (i.e., Composite Variables).

LhsId may contain a Variable of Function. In this case, LhsId performs a SetBlock on the Function Variable. This is required only in case of method update for advanced Object-Oriented Languages.

```
ADT for base LhsId
S = {LhsId}
Ω = {
        Creators:       None
                Each individual kind of LhsIds has its own Creators.
        Modifiers:
        Assign:         LhsId × X ↪LhsId
                wherein, X is either a ComputableExpr or an Accessor.
        Queries:
        Print:          LhsId → String         (Prints SValue)
        GetDesc:        LhsId → Desc
        GetAccessor:    LhsId → Accessor
}
Axioms:
        {
        Let Id be an instance of LhsId.
        GetDesc (Id) = GetDesc (GetAccessor (Id))
                The Descriptor is the same, not two Descriptors which are equal to
                each other.
        GetTypeName (Id) = LHSID
        }
PreConditions:
        {
        Let Id be an instance of LhsId.
        Let X be an instance of ComputableExpr or Accessor.
        Assign (Id, X)
                Requires:       IsEqual (GetDesc (Id), GetDesc (X))
        }
ADTforLhsIdforanElementaryVariable
S = {LhsElementary}
Ω = {
        Creators:
        CreateLhsElementary:    Accessor ↪LhsElementary
        Modifiers:
        Assign:                 LhsId × ComputableExpr ↪LhsId
        Queries:        None
}
Axioms:
        {
        Let a be an instance of Accessor.
        Let ce be an instance of ComputableExpr.
        Let le be an instance of LhsElementary.
        GetInnerTypeName (le) = VALUE
        Assign (CreateLhsElementary (a), ce)
```

-continued

```
            IMPLIES
            (
                (SetValue ( (AccessVariable (a)), Evaluate (ce))); OR
                (SetValue (AccessLocation (a)), Evaluate (ce)))
            )
        GetDesc (CreateLhsElementary (a)) = GetDesc (a)
            The Descriptor is the same, not two Descriptors which are equal to
            each other. In short, this Axiom cannot be satisfied by simply using
            two distinct Descriptors having the same properties.
        GetAccessor (CreateLhsElementary (a)) = a
    }
PreConditions:
    {
        Let a be an instance of Accessor.
        Let t be an instance of TypeName.
        Let ce be an instance of ComputableExpr.
        Let le be an instance of LhsElementary.
        CreateLhsElementary (a)
            Requires: GetInnerTypeName (GetDesc (a)) = BASICCOMPTYPE;
                    OR
                GetInnerTypeName (GetDesc (a)) = POINTER
        Assign (le, ce)
            Requires:
            IF   GetInnerTypeName (GetDesc (le)) = POINTER; AND
                GetInnerTypeName (ce) = POINTER
            THEN
                IsEqual (GetDesc (le), GetInnerTypeDesc (ce)) = T; OR
                GetInnerTypeName (GetPointedToType (GetDesc (le)))
                        = VOID
            ELSE
                The InnerTypeName is BASICCOMPTYPE - and the
                Precondition is the same as that for SetValue of BasicVar,
                described above.
    }
ADTforLhsIdforCompositeVariable
S = {LhsComposite}
Ω = {
        Creators:
        CreateLhsComposite:     Accessor ↪LhsComposite
        Modifiers:
        Assign:                 LhsId × Accessor ↪LhsId
        Queries:        None
    }
Axioms:
    {
        Let a, a1, a2 be instances of Accessor.
        Let lc be an instance of LhsComposite.
        Assign (CreateLhsComposite (a1), a2) IMPLIES
            (
                SetEnvironment (AccessLocation (a1)) =
                    GetEnvironment(AccessLocation (a2))
            )
        GetDesc (CreateLhsComposite (a)) = GetDesc (a)
            The Descriptor is the same, not two Descriptors which are equal to
            each other.
        GetAccessor (CreateLhsComposite (a)) = a
        GetInnerTypeName (lc) = ENVIRONMENT
    }
PreConditions:
    {
        Let t be an instance of TypeName.
        Let a be an instance of Accessor
        Let lc be an instance of LhsComposite.
        CreateLhsComposite (a)
            Requires: GetInnerTypeName (GetDesc (a)) = t
                wherein, t ∈ {ARRAY, RECORD}
        Assign (lc, a)
            Requires: IsEqual (GetDesc (lc), GetDesc (a)) = T
    }
ADTforLhsIdforaFunction
S = {LhsFunction}
Ω = {
        Creators:
        CreateLhsFunction:      Accessor ↪LhsFunction
        Modifiers:
        Assign:                 LhsId × Accessor ↪LhsId
        Queries:        None
    }
```

-continued

Axioms:
{
    Let a be an instance of Accessor.
    Let f1, f2 be instances of FunctionAccessor.
    Let lf be an instance of LhsFunction.
    Assign (CreateLhsFunction (f1), f2)
        IMPLIES
    (
        (SetBlock (AccessVariable (f1)), AccessVariable (f2))
            OR
        (SetBlock (AccessLocation (f1)),
                GetBlock (AccessLocation (f2)))
    )
    GetDesc (CreateLhsFunction (a)) = GetDesc (a)
        The Descriptor is the same, not two Descriptors which are equal to
        each other.
    GetAccessor (CreateLhsFunction (a)) = a
    GetInnerTypeName (lf) = BLOCK
}
PreConditions:
{
    Let a be an instance of Accessor.
    Let Lf be an instance of LhsFunction.
    CreateLhsFunction (a)
        Requires:    GetInnerTypeName (GetDesc (a)) = FUNCTION
    Assign (Lf, a)
        Requires:    IsEqual (GetDesc (Lf), GetDesc (a)) = T
}

ADT for Command

As previously noted, every programming language consists of States and Commands. Thus far the description of the present invention has focused on axiomatizing the State part of programming languages, now the Command part of programming languages will be axiomatized.

Figure 14:
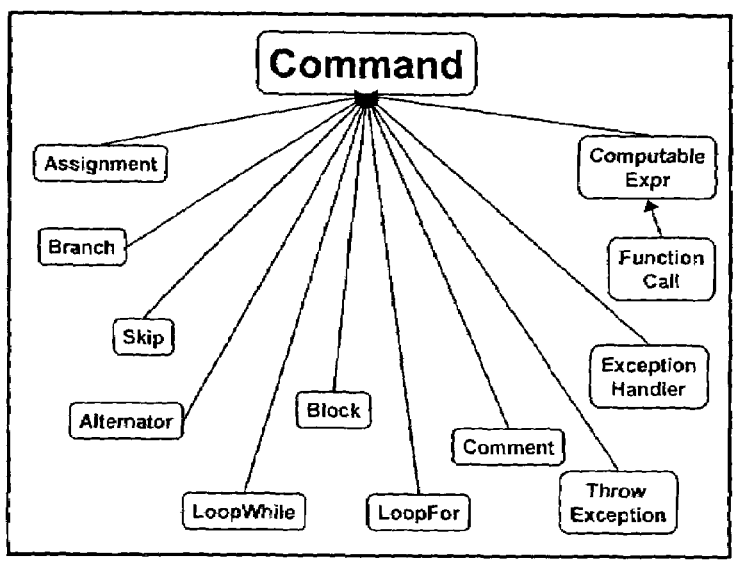
FIG. 14 is an exemplary schematic of the base Command hierarchy identified in the Generic Typed DGC Classes Framework.

The hierarchy of base Commands is provided in FIG. 14.

The particular view of a program depends on the type of programming language. For Functional Programming Languages, the program returns a Value that results from Evaluation of the Computable Expressions within it. A different view of a program as a State Transformer holds for Imperative Programming Languages wherein Evaluation of the program results in a State change, i.e., a change in Values of one or more Variables. One of the semantics of a program (either Functional or Imperative) is its Evaluation. Evaluation of a program, as defined above, is compositional, i.e., it may be defined recursively as the resultant Evaluation of the constituents of the program. For example, consider the following statements:

LoopWhile

Its evaluation is the resultant evaluation of its constituent Commands.

If-Else

Its evaluation is the resultant evaluation of its constituent Commands.

Computable Expression

Its evaluation is the resultant evaluation of its constituent Computable Expressions.

Only the Assignment Command causes a State change (in an Imperative Programming Language), whereas Computable-Expr always Evaluates to a Value in Functional as well as Imperative Programming Languages.

Command is the evaluation of a ComputableExpr that may be followed by a change of State. The following is a listing of exemplary Commands:

Assignment, Branch (Jump or Goto), Loop, Skip, Alternator.

ExceptionHandler and ThrowException are Commands used for Exception Handling.

Every Computable Expression is a Command, including FunctionCall.

Every Block (which is a collection of one or more Commands) is a Command.

A Procedure-Call is the same as a Function-Call that returns Void. Hence, Procedure-Call is considered merely a subset of Function-Call and thus there is no separate Creator is provided for Procedure-Call. Function-Call, in turn, is handled through Computable Expression (which is part of some kind of Commands such as Assignment). Hence, there is no separate Creator for Function-Call.

The properties specified for the base Command are set forth in the following algebraic specification:

```
S = {Assignment, Branch, Alternator, LoopWhile,
     LoopFor, ComputableExpr, Skip,
     Block, Comment, ThrowException, ExceptionHandler}
Ω = {
     Creators: None
         Each individual kind of Command has its own Creators.
     Modifiers:
     SetLabel:        Command × String ↪Command
         Label is not mandatory for Command. Hence, this "SetLabel"
         is used to associate a Label with a Command.
     SetAddedToBlock: Command → Command
     Queries:
     GetLabel:        Command → String
     Print:           Command → String      (Prints SValue)
     Evaluate:        Command × State → State
     IsAddedToBlock:  Command → Bool
     IndividualCreatorsfordifferentkindsofCommand:
     Since only the Creator functions differ for each individual
     kind of Command, for convenience the Creator functions are
     listed here instead of in their own separate ADTs.
     The only exception being the Block Command,
     which is described
     separately in its own ADT further below.
     CreateAssignment: LhsId × Rhs ↪Assignment
         wherein, Rhs is either a ComputableExpr or an Accessor.
```

```
CreateBranch:         String → Branch
   The String parameter is the Label of another Command to
   which the Branch should take place.
CreateAlternator:    List [BooleanExpr,
Command] → Alternator
   The List is a standard list of a tuples of [BooleanExpr,
   Command] and hence is not axiomatized any further.
   An If-Else is a specialized version
   of Alternator having a List of 2 tuples.
      The 1st tuple represents the If part;
      The 2nd tuple represents the Else part. The BooleanExpr of
      this tuple is the negation of the 1st BooleanExpr (of the first
      tuple).
   A Switch-Case is also a specialized version of Alternator -
   where the BooleanExpr for each Case is a
   BooleanExpr with the Integer
   Value for the Case in it, and the Default is a negation of the
   disjunction of all the preceding BooleanExpr.
CreateLoopWhile: BooleanExpr × Command → Loop
CreateLoopFor:   BooleanExpr × Command ×
                 LoopVar × Step → Loop
   LoopVar is a Variable of Int, and Step
   is a non-zero Constant of Int.
   In LoopFor, BooleanExpr should have LoopVar as one of its
   constituents.
CreateSkip:            Φ → Skip
CreateComment:         String → Comment
CreateThrowException:  X → ThrowException
   wherein, X here is either an Accessor or an Expression.
CreateExceptionHandler: Block × Block ×
                        List [String, Desc, Block]
                        → ExceptionHandler
   wherein, the first Block is the Try Block, the
   second Block is the Clean Up Block and the
   list is a standard list of handlers, wherein
   each handler contains the following:
      a String (possibly empty), which is the name
      of the placeholder holding the Exception
      Object to be handled by the handler
      Block;
      a Descriptor stating the type for which the
      handler Block has to be executed; and
      the handler Block to be executed.
}
Axioms:
{
   Let c be an instance of Command.
   Let s be an instance of String.
   Let t be a TypeName.
   GetLabel (SetLabel (c, s)) = s
   GetTypeName (c) = COMMAND
   GetInnerTypeName (c) = t
      where t ∈ {BRANCH, SKIP, BLOCK,
      ASSIGNMENT, LOOP-FOR,
         LOOP-WHILE, ALTERNATOR, COMMENT,
         COMPUTABLE_EXPR, THROW_EXCEPTION,
         EXCEPTION_HANDLER}
   The Creators for each individual kind of Command
   sets up the appropriate InnerTypeName.
   IsAddedToBlock (SetAddedToBlock (c)) = T
   IsAddedToBlock (CreateX( )) = F
      wherein, CreateX stands for the Creators for each
      individual kind of Command.
}
Preconditions:
{
   Let k be an instance of LhsId.
   Let c be an instance of ComputableExpr or Accessor.
   Let f be an instance of FunctionAccssor.
   Let z be an instance of Command and s be an instance of String.
   Let e be the Environment where the Label is to be set.
   CreateAssignment (k, c)
      Requires:
         IsEqual (GetDesc (k), GetDesc (c)) = T;
         OR
         (GetInnerTypeName ((GetDesc (k))) =
         BASICCOMPTYPE;
            AND
         GetCompTypeName (GetDesc (k)) = VOID;
            AND
         GetInnerTypeName (GetDesc (c)) = POINTER];
         OR
         [GetInnerTypeName ((GetDesc (k))) = POINTER;
            AND
         GetCompTypeName (GetPointedToTypeDesc (GetDesc (k))
            = VOID;
            AND
         GetInnerTypeName (GetDesc (c)) = POINTER]
   SetLabel (z, s)
      Requires:  IsEmpty (s) = F; AND
                 IsAddedToBlock (z) = F
}
```

ADT for Block

A Block is represented as a "D in C" wherein, the D (Declarations) part of the Block is the Environment and the C (Commands) part of the Block is the Command (Statement) List. On creation, a Block has an empty Command List as well as an empty Environment. Creation of Block is done either in the parser (when an unnamed Block is required as a Command), or from within CreateFunction.

```
S = {Block}
Ω = {
   Creators:
   CreateBlock:     Φ → Block
   Modifiers:
   AddCommand: Block × Command ↪Block
   SetAsConstant: Block → Block
      This is applicable to Blocks within Functions and is
      SetAsConstant whenever the Function is SetAsConstant.
   Queries:
   IsEmpty:         Block → Bool
   HasCommands:     Block → Bool
   IsConstant:      Block → Bool
   Evaluate:        Block × State ↪State
   Print:           Block → String      (Prints SValue)
   GetEnvironment:  Block → Environment
   IsStatementLabelPresent: Block × String ↪Bool
}
Axioms:
{
   Let b be an instance of Block.
   IsEmpty (b) This Axiom is the equivalent of the following
      conditions being satisfied:
      (
         Not (HasCommands (b);    AND
                    IsEmpty (GetEnvironment (b))
      )
   IsEmpty (CreateBlock ( )) = T
   HasCommands (AddCommand (b)) = T
   IsConstant (CreateBlock ( )) = F
   IsConstant (SetAsConstant (b)) = T
   IsAddedToBlock (CreateBlock ( )) = F
}
PreConditions:
{
   Let b be an instance of Block.
   Let c be an instance of Assignment.
   AddCommand (b, c)
      Requires:    IsConstant (b) = F ; AND
                   IsComplete (b) = F; AND
                   ( IsEmpty (GetLabel(c)) OR
                   IsStatementLabelPresent (b, GetLabel(c))
                   = F )
   A Constant Block (which is part of Constant Function) cannot
   contain an Assignment since Assignment is the only
   Command that changes State and thus would violate the
   condition of constancy.
}
```

ADT for GOTO (Branch)

A GOTO (Branch) requires a Label to branch to. However, when a GOTO is encountered, the corresponding Label need not have been encountered or declared (e.g., if the Label is in the text subsequent to the occurrence of the GOTO). In anticipation of such cases, Block needs to maintain a list of undeclared Labels. As and when a Label declaration is encountered, Block will take that Label off the list of undeclared Labels.

Hence, the following enhancements of properties for GOTO must be added in addition to those found in the ADT for Block (as specified above):

```
Modifiers:
    AddUndeclaredTargetLabel:    Block x String → Block
    DeleteUndeclaredTargetLabel: Block x String → Block
    SetAsComplete:               Block → Block
Queries:
    HasUndeclaredTargetLabel:    Block → Bool
    IsComplete:                  Block → Bool
Axioms:
    Let b be an instance of Block.
    Let s be an instance of String (indicating Label).
    HasUndeclaredTargetLabel (AddUndeclaredTargetLabel (b, s)) = T
    IsComplete (CreateBlock ( )) = F
    IsComplete (SetAsComplete (b)) = T
Preconditions:
    Let b be an instance of Block.
    Let c be an instance of Command.
    Evaluate (or execute) for Block cannot be performed if there is anything
    undeclared in Block. Hence we specify the following Preconditions:
    Evaluate (b)
        Requires:   HasUndeclaredTargetLabel (b) = F; AND
                    IsComplete (b) = T
    AddCommand (b, c)
        Requires:   IsComplete (b) = F
```

ADT for Function

Function is representative of a named Block. The creation of a Function also requires a Descriptor, like that for Variable. This Descriptor has the specifications for the Types of Arguments to the Function, and its return Type.

```
S = { Function}
Ω = {
    Creators:
    CreateFunction: FunctionDesc x String → Function
        Construction of Function consists of Type-Name binding,
        followed by giving it a Block, but this is not explicit
        in the Creator. The Block will not be empty as it
        contains the Self Variable of the Function and the
        Parameters of the Function. However, since the Function
        body is not yet in place, the Query IsDefined
        returns FALSE at this point. Location for a Function
        is given by its parent Environment at the time of
        creation, but this is not explicit in the Creator.
    Modifiers:
    SetBlock: Function x Function ↳Function
        SetBlock is provided for the purposes of method update.
        The Block of the 2nd Function is copied, thereby
        overwriting the existing Block of the 1st Function.
        Function is also a kind of Variable; hence, its ADT inherits
        all the Modifiers and Queries of base Variable.
    Queries:
    IsDefined:      Function → Bool
    Print:          Function → String (Prints SValue)
    Evaluate:       Function ↳Value (Evaluates RValue)
    GetLocation:    Function → Location
    GetEnvironment: Function → Environment
    GetBlock:       Function → Block
    GetTypeName:    Function → TypeName
    GetInnerTypeName: Function → TypeName
    GetName:        Function → String
    GetDesc:        Function → FunctionDesc
    }
    Axioms:
    {
    Let s be an instance of String, which names the Function.
    Let d be an instance of Descriptor for Function.
    Let f, f1, f2 be instances of Function.
    GetTypeName (f) = VARIABLE
    GetInnerTypeName (f) = FUNCTION
    GetInnerTypeName (GetLocation (z)) = BLOCK
    GetDesc (CreateFunction (d, s)) = d
    IsDefined (f) = IsComplete (GetBlock (f))
    GetEnvironment (f) = GetEnvironment (GetBlock (f))
    GetEnvironment (f) = GetEnvironment
        (GetBlock (GetLocation (f)))
    GetBlock (f) = GetBlock (GetLocation (f))
    SetBlock (f1, f2) = SetBlock (GetLocation (f1), GetBlock (f2))
    IsConstant (CreateFunction (s, d)) = F
    IsConstant (SetAsConstant (f)) = T
        A Constant Function cannot contain an Assignment.
        Commands are added to Function via Block. So, when
        SetAsConstant is invoked on Function, it is also
        invoked on the Block for the Function, resulting
        in the following Axiom:
    EqualBool (IsConstant (GetBlock (f)), IsConstant (f)) = T
    }
    Preconditions:
    {
    Let s be an instance of String, which names the Function.
    Let d be an instance of Descriptor for Function.
    Let f, f1, f2 be instances of Function.
    Let e be an instance of Environment
        in which the Function is to be created.
    CreateFunction (d, s)
        Requires:   IsEmpty (s) = F ; AND
                    IsNamePresent (e, s) = F
    SetBlock (f1, f2)
        Requires:
            IsConstant (f1) = F; AND
            IsEqual (GetDesc (f1), GetDesc (f2)) = T
    Evaluate (f1)
        Requires:
            GetInnerTypeName (GetReturnTypeDesc (GetDesc (f1)))
                = BASICCOMPTYPE;
            OR
            GetInnerTypeName (GetReturnTypeDesc (GetDesc (f1)))
                = POINTER
    }
```

ADT for Environment

Programs in a Programming Language are defined and executed in the context of an Environment. This Environment has the knowledge of the Types supported by the Programming Language and its Typing Rules. The Environment is the substrate Type on which a Programming Language is defined, constructed, and executed.

The Environment consists of:

Language Context—which is the knowledge of the Types supported by the Language and the Typing Rules. This defines the language.

Program State—which is the set of Variables (and their Values) declared for a given program. An execution of a Program is a function from State to State.

For ease of manageability, the ADT for Environment is partitioned into its separate interfaces (wherever appropriate) for achieving a set of related objectives. The Environment is the container for all Types. Hence, the Creators for all Types (as mentioned in their respective ADTs) are actually targeted on the Environment. In other words, each of these Creators has Environment as an Argument (which has not been mentioned explicitly in the ADTs). Hence, the Creators in this section are only repeated explicitly when necessary for clarity.

---

S = {Environment}
Ω = {
    Creators:
    CreateEnvironment:   Φ → Environment
    Queries:
    IsEmpty:          Environment → Bool
        Environment is empty if it does not have any Type instantiated
        in the form of Variable/Function declarations. However, the
        Environment does have knowledge of Types.
    Print:            Environment → String
    Axioms:
    Let e be an instance of Environment.
    GetTypeName (e) = ENVIRONMENT
    GetInnerTypeName (e) = ENVIRONMENT
    IsEmpty (CreateEnvironment ( )) = T
        The Axiom IsEmpty returns FALSE once anything
        is created in it through any of
        the Creators for any Type.

---

Chaining of Environments & Scope Rules

The Environment is responsible for creating other Environments that are internal to it. Such chaining of Environments occurs at the time of creating Variables of Record/Array, and Functions and Blocks. Whenever an Environment creates an inner Environment, it passes itself as the parent for the inner Environment. This chaining is required for defining scope rules.

Any Get query on Environment begins from the current Environment and expands its search by going upwards to its parent (and continuing upwards to the outermost Environment) until such time the Get succeeds or fails (as is the case where there are no more Environments available for search).

---

Modifiers:
CreateInnerEnvironment: Environment → Environment
    A new Environment is created and the input Environment is
    updated to reflect the creation and chaining.
SetParentEnvironment:   Environment x Environment
            → Environment
  wherein, the 2$^{nd}$ Environment is the Parent.
    This is required just in case the Parent needs to
    be changed to reflect dynamically changing scope
    rules (such as that for the Environment of a
    Class in any Object-Oriented programming language).
AddModul : Environment x String → Environment
    A new Module Environment is created and the input
    Environment is updated to reflect the creation
    and chaining. The Module Environment is
    contained in the input Environment,
    and is referred to by the name given
    by the second String parameter.
Queries:
HasParentEnvironment:    Environment → Bool
GetParentEnvironment:    Environment ↪Environment
HasModule:            Environment x String → Bool
GetModule:            Environment x String ↪Environment
Axioms:
Let e1, e2 be instances of Environment.
GetParentEnvironment (CreateInnerEnvironment (e1)) = e1
GetParentEnvironment (SetParentEnvironment (e1, e2)) = e2
Preconditions:
Let e be an instance of Environment.
Let s be an instance of String.
GetParentEnvironment (e)
   Requires: HasParentEnvironment (e) = T
GetModule (e, s)
   Requires: HasModule (e, s) = T GenericQueriesandPreconditions
  QueriesonName,VariableandLocation
  IsVariablePresent: Environment x String → Bool
  IsFunctionPresent: Environment x String → Bool
  IsConstantPresent: Environment x String → Bool
  IsValidLocation: Environment x ValueAddress → Location
  GetVariable: Environment x String ↪Variable
  GetFunction: Environment x String ↪Function
  GetConstant: Environment x String ↪Constant
  GetLocationForAddress: Environment x ValueAddress ↪Location
    Environment assigns an Address to every Location and
    allocates it to Variable. Environment therefore has a map of
    Address to Location, and one can get to any Location from an
    Address by querying Environment (this is done in case of
    Pointer, where there may not be a Variable).
  QueriesonDescriptor
  IsXXXDescPresent:   Environment x String → Bool
    where XXX = BasicCompTypeDesc or Array or Record or Pointer
      or Function.
  IsDescPresent: Environment x String → Bool
  GetBasicCompTypeDesc: Environment x String →
                BasicCompTypeDesc
  GetPointerDesc: Environment x String → PointerDesc
  GetArrayDesc: Environment x String → ArrayDesc
  GetRecordDesc: Environment x String → RecordDesc
  GetFunctionDesc: Environment x String → FunctionDesc
  GetDesc: Environment x String → Desc
  IsNamePresent: Environment x String → Bool
    The query IsNamePresent is the Logical OR of the following four
    queries: IsVariablePresent, IsFunctionPresent, IsConstantPresent,
    IsDescriptorPresent.
  IsAccessible: Environment x String ↪Bool
  IsPrivate: Environment x String ↪Bool
    Every Variable contained in the Environment is present
    with a Status, whether it is Private or Public.
    IsPrivate returns this status of the Variable.
    IsAccessible returns true in the following cases:
      The Variable is present in the Environment or in
      one of its Parents (up the Environment chain); or
      The Variable is present in one of the Module Environments
      contained in the Environment, and is not private in that Module.
Axioms:
If a Location with ValueAddress has been allocated to a Variable,
then the Location returned by querying the Variable, and the one
returned by querying the Environment for that Variable are the same.
This is reflected in the following:
Let v be an instance of Variable.
GetLocation (v) = GetLocationForAddress (e, GetAddress (v))
Preconditions:
Let e be an instance of Environment.
Let d be an instance of Desc.
Let b be an instance of BasicTypeDesc.
Let p be an instance of PointerDesc.
Let a be an instance of ArrayDesc.
Let r be an instance of RecordDesc.
Let f be an instance of FunctionDesc.
Let s be an instance of String.
Let v be an instance of Value.
Let va be an instance of ValueAddress.
GetVariable (e, s)
  Requires: IsVariablePresent (e, s) = T
GetFunction (e, s)
  Requires: IsFunctionPresent (e, s) = T
GetConstant (e, s)
  Requires: IsConstantPresent (e, s) = T
GetXXXDesc (e, s)
  Requires: IsXXXDescPresent (e, s) = T
  where XXX = BasicCompTypeDesc or Array or Record or Pointer
      or Function.
GetDesc (e, s)
  Requires: IsDescPresent (e, s) = T
GetLocationForAddress (e, va)
  Requires: IsValidLocation (e, va) = T
IsAccessible (e, s)
IsPrivate (e, s)

-continued

The previous two Preconditions require: IsVariablePresent (, s) = T
Simulating Modules
  Modifiers:
  MergeEnvironment: Environment × Environment ×
                 String → Environment
    This Modifier is for simulating Modules. The elements of $2^{nd}$
    Environment (belonging to the Module) are merged into the $1^{st}$
    Environment. The String represents Name of the Module and it
    cannot be empty.
    In the case in which the Names of one or more elements clash in
    the two Environments, then the names are differentiated by appending
    to them the Name of the Module. This ensures uniqueness of Names.
    The uniqueness of Names in the $1^{st}$ Environment is checked by
    corresponding queries for Name in Environment.

Thus, each kind of Type and their respective properties has been specified by an appropriate ADT above. Having described the Classes for each Type in the Generic Typed DGC Classes Framework in accordance with the present invention some exemplary applications of this framework will now be addressed. The present inventive Generic Typed DGC Classes Framework is suitable for a wide variety of language tools such as, but not limited to, high-level programming language translation, compilation or static analysis.

Language Conversion

Because of the independence of the Generic Typed DGC Classes Framework to syntax of any programming language, it is particularly well suited for high-level language translation of a source high-level language computer program to an equivalent computer program in a target high-level language different from that of the source language. Alternatively, as discussed in detail further below, the present inventive framework may be used as a compiler when the target language is a low level language.

Figure 15:
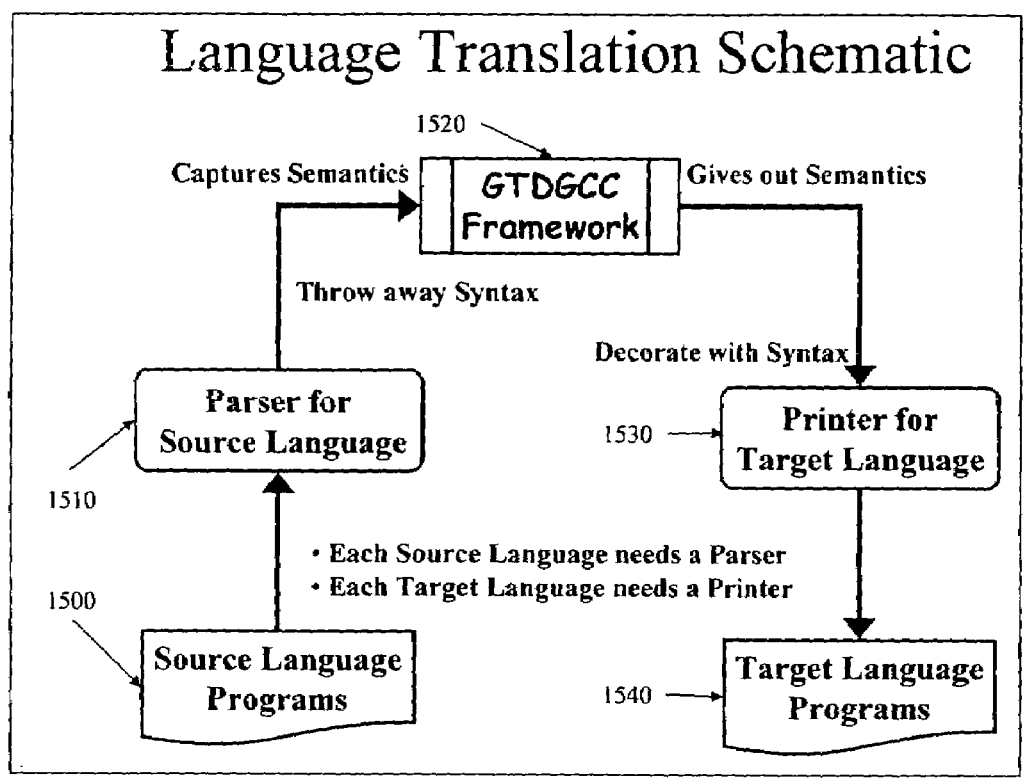
FIG. 15 is an exemplary schematic diagram of language conversion (e.g., language translation and/or compilation) using the present inventive Generic Typed DGC Classes Framework in accordance with the present invention.

FIG. 15 is an exemplary schematic diagram of language conversion (e.g., language translation and/or compilation) using the present inventive Generic Typed DGC Classes Framework. At the front end, a parsing interface 1510 parses a source program 1500 written in a particular source language. The parsing interface 1510 is language specific, thus, a different interface will be necessary for each source language. The corresponding classes are instantiated from the Generic Typed DGC Classes Framework 1520 thereby creating a semantic representation of the source program in memory. This activity is performed in the Semantic Actions of the parser. Thus, all syntax is stripped from the source program—however, the semantics of the source program is entirely captured by the Generic Typed DGC Classes Framework.

For example, in a Source Program written in Pascal when the parsing interface comes across the Variable Declaration:
  Var a: Array [5] of integer;

The Generic Typed DGC Classes Framework instantiates the Class ArrayVariable that is added to the already instantiated Class Environment Similarly, for the Assignment Statement of a Source Program written in Pascal as:
  a[2:=20;

The Generic Typed DGC Classes Framework instantiates the Class Assignment that is added to the already instantiated Class Block.

On the other end, a printer interface 1530 is plugged in to receive the semantic representation produced by the Generic Typed DGC Classes Framework 1520 that is combined with the syntax of the Target Language. The combination produces code in the Target Language 1540. The Printer Interface is language specific, thus a different printer interface will be plugged in for each Target Language.

For instance, the above Variable Declaration (which is now in memory in the form of the object of the Class ArrayVariable is printed in the Target Language C as:
  int a[5];

While the object of the Class Assignment is printed in the Target Language C as:
  a[1]=20;

It is to be noted in the example provided above that the indexing of the second array element has been changed. Array indexing in Pascal starts from "1" whereas indexing in C begins from "0". Accordingly, the second array element in Pascal is represented by "a[2]", but in C is represented as "a[1]".

These same principles may be adapted for conversion of an entire program module. By way of example, language conversion using the Generic Typed DGC Classes Framework will now be described for an example source program module referred to as "Unit4.PAS", written in the Delphi programming language and converted to its corresponding C++ code.

The example Unit4.PAS Source Program module (in Delphi programming language) is reproduced below with line numbers provided for convenience:

```
1   unit unit4;
2   interface
3   const
4   unit4__IntConst = 100;
5   type
6   unit4__Int = integer;
7   (* Pointer to integer *)
8   unit4__IntPtr = ^unit4__Int;
9   var
10  unit4__IntVar1,unit4__IntVar2 : unit4__Int =
    unit4__IntConst;
11  unit4__IntPtrVar : unit4__IntPtr;
12  procedure unit4__AddProc(var a : unit4__IntPtr);
13  function unit4__Mult(var unit4__IntVar1 : unit4__Int;
       const unit4__IntVar2 : unit4__IntPtr) :
       unit4__Int;
14  implementation
15  procedure unit4__AddProc(var a : unit4__IntPtr);
16  var
17  Local__Var : unit4__Int;
18  { Function within a procedure }
19  function unit4__Add(in a, b: integer): integer;
20  begin
21  unit4__Add := a + b;
22  end;
23  begin
24  Local__Var:= unit4__Add(unit4__IntVar1,
    unit4__IntVar2);
25  a^ := Local__Var;
26  end;
27  function unit4__Mult(var unit4__IntVar1 : unit4__Int;
       const unit4__IntVar2 : unit4__IntPtr) :
       unit4__Int;
28  begin
29  unit4__Mult := unit4__IntVar1 * (unit4__IntVar2^);
30  end;
31  end.
```

Following the conversion process shown in FIG. 15, initially the source language (Delphi) is parsed using a parsing interface that is plugged into the front end and the semantics are capture by instantiating Classes from the Generic Typed DGC Classes Framework. The actions taken by the parser for instantiating appropriate ADT-based Classes from the Generic Typed DGC Classes Framework is described for each line of the exemplary source program above and produces the following semantics representation.

Line 1:

The Parser instantiates a Block for unit4. This Block contains an empty Environment, and an empty Command list.

Line 2:

Ignored by the parser (as the keyword interface denotes the beginning of the Interface Section).

Line 3:

Ignored by the parser (as the keyword const denotes the beginning of the Constant Section).

Line 4:

The parser instantiates a Constant with InnerTypeNameInt for unit4_IntConst. This Constant has a ValueInt contained in it. This ValueInt object is given the Integer Value 100. This Constant is then added to the Environment of the Block for unit4.

Line 5:

Ignored by the parser (as the keyword type denotes the beginning of the Type Section).

Line 6:

The parser instantiates a BasicCompTypeDesc with InnerTypeName Int for the newly defined type unit4_Int. This Descriptor is named, and gets the name unit4_Int. It is then added to the Environment of the Block for unit4.

Line 7:

Ignored for the purposes of this exemplary description (as it is a Comment, though there is a Command called Comment in the Generic Typed DGC Classes Framework).

Line 8:

The parser now instantiates a PointerDesc for the newly defined type unit4_IntPtr. This Descriptor is named, and gets the name unit4_IntPtr. Since this is a Descriptor of Type Pointer, it is given a "PointedToTypeDesc" —i.e. the Descriptor of the Type pointed to by this Pointer. In this case the "PointedToType" given is unit4_Int. This PointerDesc is then added to the Environment of the Block for unit4.

Line 9:

Ignored by the parser (as the keyword var denotes the beginning of the Variable Section).

Line 10:

The parser now instantiates a BasicVariable for each of the Variables with the names unit4_IntVar1, unit4_IntVar2 respectively. Both have as their Type Descriptor the Descriptor created in Line 6 (i.e. unit4_Int), and both have their Values equated to the Value of the Constant defined in Line 4. These Variables are then added to the Environment of the Block for unit4.

Line 11:

The parser now instantiates a PointerVariable for the Variable with the name unit4_IntPtrVar. It has as its Type Descriptor the Descriptor created in Line 8. This Variable is then added to the Environment of the Block for unit4.

Line 12:

The parser now instantiates a FunctionVariable for the Procedure with the name unit4_AddProc. This FunctionVariable has a list of Arguments, and a return Type. Since unit4_AddProc is a Procedure, the return Type of this FunctionVariable is set to VOID. The Arguments of the FunctionVariable are set according to the list given in the function/procedure declaration. Therefore, for unit4_AddProc, the argument list contains one argument, which is a Variable of Type unit4_IntPtr. This FunctionVariable is then added to the Environment of the Block for unit4.

Line 13:

The parser now instantiates another FunctionVariable for the Function with the name unit4_Mult. Its return Type is set to unit4_Int, and its list of arguments is set according to the list here (i.e., the first argument of name unit4_IntVar1 and type unit4_Int, and the second argument of name unit4_IntVar2 and type unit4_IntPtr). This FunctionVariable is then added to the Environment of the Block for unit4.

Line 14:

The keyword implementation denotes the beginning of the Implementation Section. Therefore, no further Variables/Types/Constants are to be added to this Block.

Line 15:

The parser now comes across the body or definition of the Procedure unit4_AddProc. This marks the beginning of the inner (local) Environment of this Procedure.

In the building of the memory representation, there is an important change that happens at this point. So far, all Variables, Type declarations, Constants etc. were being added to the environment of Block for unit4. However, now, with the start of the Function definition, the current Environment (which was thus far of the Block for unit4) now changes.

The FunctionVariable contains within it a Block to which the parser will add the code and the local Environment for that Function. Therefore, the current Environment now becomes the Environment of the FunctionVariable.

Line 16:

Ignored by the parser (as the keyword var denotes the beginning of the Variable Section).

Line 17:

The parser now instantiates a BasicVariable for the Variable with name Local_Var. It has as its Type Descriptor the Descriptor created for Line 6. This Variable is now added to the current Environment, which is the Environment of the FunctonVariable unit4_AddProc.

Line 18:

Ignored for the purposes of this exemplary description (as it is a Comment, though there is a Command called Comment in the Generic Typed DGC Classes Framework).

Line 19:

Now the parser instantiates a FunctionVari ble for the Functi n with the name unit4_Add. Its return Type is set to Integer (which is available as a Basic Computable Type in the Language Context), and its list of arguments is set according to the list here (i.e., both arguments are of type integ r, with names a and b respectively.). This FunctionVariable is then added to the Environment of the current Block (i.e., that of the FunctionVariable named unit4_AddProc).

Line 20:

The keyword begin is the beginning of the Commands section of a Block.

Since the body or definition of the Function named unit4_Add starts immediately, the changing of the "current Environment" happens here as described in the explanation of Line 15. The current Block & Environment are now the Block & Environment of the FunctionVariable named unit4_Add.

Line 21:

The parser now instantiates an Assignment Command for the Assignment statement unit4_Add:=a+b.

The things that happen before this are:
An LhsId (Left-hand-side identifier) is created for unit4_Add.
An ArithmeticAddExpression is created for a+b.

These are the two inputs required in the construction of the Assignment, which is now added to the Commands of the Block for unit4_Add.

Line 22:

The keyword end marks the ending of the Commands section of the current Block. Another important change happens here. The inner Block (of the Function named unit4_Add) has been completed. This Block is not the current Block anymore. The curent Block now happens to be the Block of the Procedure named unit4_AddProc).

Lines 23-26:

The parser now constructs and instantiates (in a manner similar to that done earlier for Line 21) the two Assignments and adds them to the Commands section of the Block for unit4_AddProc. The building of the memory representation like that explained earlier for Lines 19-22.

Lines 27-30:

The parser now comes across the body or definition of the Procedure named unit4_Mult. The building of the memory representation is similar to that explained earlier for Lines 19-22.

Line 31:

The keyword end marks the ending of the Commands section of the current Block. Since this is the last (or the outermost) Block, this is the end of the entire unit (i.e., end of unit4).

Figure 18:
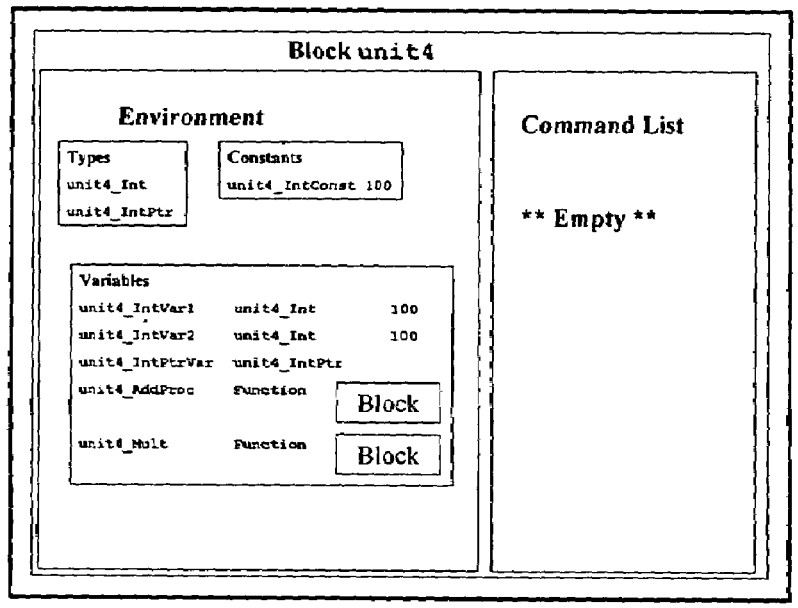
FIG. 18 is an exemplary schematic of the memory representation of Block unit4.
Figure 19:
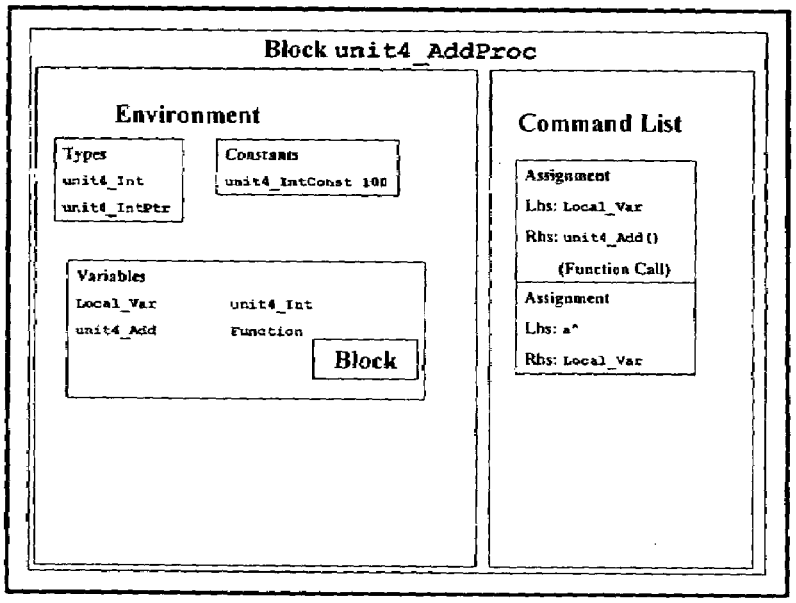
FIG. 19 is an exemplary schematic of the memory representation of Block unit4_AddProc.

FIGS. 18 and 19 are exemplary schematics of the memory representations of the Blocks named unit4 and unit4_AddProc, respectively, in the example provided above.

On the back end, a printing interface is plugged to generate Code in the Target Language, which in this example is C++. The printing interface, performs the following:

1. Takes the Semantics produced by the Generic Typed DGC Classes Framework (i.e., from the Semantic representation created above.)
2. Combines the semantic representation with the Syntax of C++; and
3. Generates Source Code Files for C++.

For the above module "Unit4.PAS", the C++ Printing Interface generates the following two files in C++ viz: "unit4.h" and "unit4.cpp". The code for both these files is given here. The generated C++ code is semantically equivalent to that of the input Delphi code.

```
I-Codeforunit4.h
typedef int unit4__int;
typedef unit4__int *unit4__intptr;
void unit4__addproc(unit4__intptr * a);
unit4__int unit4__mult(unit4__int * unit4__intvar1, unit4__intptr unit4__intvar2);
const int unit4__intconst = 100;
```

```
-continued unit4__int unit4__intvar1 = unit4__intconst;
unit4__int unit4__intvar2 = unit4__intconst;
unit4__intptr unit4__intptrvar;
II-Codeforunit4.cpp
  #include "unit.h"
  void main( )
  {
    {
    }
  }
  void unit4__addproc(unit4__intptr * a)
  {
    struct__DGC__unit4__addprocEnv runit4__addproc;
    runit4__addproc.a = a;
    int unit4__add(struct __DGC__unit4__addprocEnv&, int, int);
    runit4__addproc.local__var = unit4__add(runit4__addproc,
      unit4__intvar1, unit4__intvar2);
    (*(*(runit4__addproc.a))) = runit4__addproc.local__var;
  }
  int unit4__add(struct __DGC__unit4__addprocEnv
       &DGC__unit4__addproc, int a, int b)
  {
    int unit4__add;
    unit4__add = (a + b);
    return unit4__add;
  }
  unit4__int unit4__mult(unit4__int * unit4__intvar1,
       unit4__intptr unit4__intvar2)
  {
    unit4__int unit4__mult;
    unit4__mult = ((*(unit4__intvar1)) * (*(unit4__intvar2)));
    return unit4__mult;
  }
```

The printing interface starts with the outermost Block. The Environment of the Block is printed first, and then its list of Commands. Each construct is printed recursively—till the basic construct is reached. Printing of the major constructs is explained below:

Block:

For printing a Block (which may or may not belong to a Function)—the printing interface first prints the opening brace (as per the C++ syntax), then recursively asks the Environment and the Commands of the block to print themselves, and then prints the closing brace (again as per the C++ syntax).

Each of the ADTs of the Generic Typed DGC Classes Framework has the built-in capability of printing itself in a generic manner. For printing specific syntax of programming, these capabilities are enhanced with the syntactical elements of the specific languages (C++ in this example).

Environment:

Printing of the Environment involves printing of the User Defined Types, Constants and Variables, in that order. Each User Defined Type is printed as per the C++ 'typedef' syntax.

Variable:

Printing of a Variable involves printing of its Type, followed by its Name, and followed by its default Value (if any).

Assignment:

Printing of an Assignment involves printing of the LhsId (which is usually the Name of the Lhs Variable), followed by the C++ assignment operator '=', followed by the printing of the Rhs Expression.

As is evidenced by the example described above, the Generic Typed DGC Classes Framework in accordance with the present invention may be readily used for high level language translation. Use of the Generic Typed DGC Classes Framework in connection with high-level language translation is beneficial over conventional language converters in several respects. The language and syntax independence of the present inventive Generic Typed DGC Classes Framework eliminates all possibility of syntax-related conversion errors. Along these lines, since the Generic Typed DGC Classes Framework is based entirely on semantics, rather than syntax, the original computer program written in the source language and the translated computer program written in the target language will always be semantically equivalent. That is, the translated computer program written in the target language when executed in the same environment is guaranteed to produce the same results as those produced by the original computer program written in the source language.

Yet another benefit associated with using the present inventive Generic Typed DGC Classes Framework for high level language translation is that since different constructs in programming languages are nothing but compositions of the core concepts present in the intermediate Generic Typed DGC Classes Framework, even those features present in the Source Language yet not available in the Target Language can still be converted.

Several illustrative examples of application of the Generic Typed DGC Classes Framework for programming language conversion are discussed below:

1. Conversion of Nested Functions from Pascal to C:

Pascal supports nested Functions (one function block within another), but C does not. The semantics behind nested Functions in Pascal is that the Environment of the outer Function is available to the inner Function. Generally, the nesting Function is broken down into its components, namely, capturing the Environment of the outer Function, and making this Environment available to the inner Function. This same functional result is realized in C by storing the Environment as a data structure, and passing the data structure as an additional parameter to the inner function. The converted inner function in C behaves exactly in the same manner as the original Pascal nesting function.

2. Conversion of with-do Statement from Pascal to C:

Pascal has a construct "with<Variable> do <statements>" used for record type variables, wherein, "With" simply provides an abbreviated notation for referring the fields of a record or structure. C does not include this construct, but the same functionality may be realized. When converting a "with . . . do . . . " construct, all variable references in the statements occurring in the <statements> part are appended by the name of the record variable. The converted C code performs exactly in the same manner as the original Pascal statement.

In a similar exemplary application, the present inventive Generic Typed DGC Classes Framework may be used to develop the first phase of a compiler, i.e., to generate assembly or object code. Compilers can also be classified as Language Converters, albeit, conversion of a high-level language to a lower level machine language.

To build a retargetable compiler, based on the Generic Typed DGC Classes Framework, and which is independent of the particular programming language requires:

a parser interface at one end; and a printing interface at the opposite end to print out the generated assembly or object code, This uses the same system and method shown in FIG. 15 and described above with respect to high-level language translation. The only difference being that instead of the Target Language being a high level program language in the case of Language Translation, when used as a compiler the Target Language is assembly or object code.

Both conventional compilers and those based on the Generic Typed DGC Classes Framework preserve semantics, however, only the Generic Typed DGC Classes Framework based compilers (in accordance with the present invention) provide semantics explicitly and compositionally.

Numerous advantages are provided by using the Generic Typed DGC Classes Framework based compiler instead of a conventional compiler. Heretofore, compilers typically used Composable Attribute Grammar (CAG) as a parsing technique. A CAG is represented as a composite of several smaller component Attribute Grammars (AGs), each designed to solve a particular sub-problem such as scope resolution, expression or evaluation. Thus, large problems are decomposed into smaller component sub-problems each handled by a component Attribute Grammar. In addition to the component Attribute Grammars (AGs), the CAG also consists of glue Attribute Grammar and an interface, which defines the correspondence between the glue and the component AGs. The glue AG is an AG with underlying context-free grammar specifying the phase-structure of the source language.

Each component AG is based on a simplified phrase-structure that reflects the properties of its sub-problem rather than the phrase-structure of the source language. This decomposition principle associated with component AGs is similar in nature to the core concepts or building blocks that form the very basis for the present inventive Generic Typed DGC Classes Framework. Instead of providing different component AGs it is simpler to add different interfaces for different Generic Typed DGC Classes Framework constructs in accordance with the present inventive framework. The present inventive Generic Typed DGC Classes Framework, being generic, can capture the semantics of any language. Hence, the use of CAGs is limited to defining the phase structure of the source language at hand, i.e., for writing the language specific parser.

Another advantage associated with the present inventive Generic Typed DGC Classes Framework based retargettable complier is that it has no language dependency or execution model dependency typical of intermediate code forms (e.g., Postfix Notation, Parse Trees (Abstract Syntax Trees), Three-Address codes (triplet/quadruple)) used in code generation with conventional compilers. Each of these conventional intermediate code forms has some form of language or execution model dependency. Postfix Notation is only suitable with functional languages in which the source program is mostly expressions. Parse Trees are extremely dependent on the source language syntax. Three-Address codes are preferred in many optimizing compilers since it permits rearrangement of intermediate code in a convenient manner. However, every triplet/quadruple entry requires the storage of pointer to Symbol Table entries of the respective symbols involved in their formation. In addition, every triplet/quadruple entry increases the number of temporaries required for code evaluation. Accordingly, Three-Address codes are mostly suitable for registered-based machines.

The Generic Typed DGC Classes Framework based compiler in accordance with the present invention overcomes all these language and execution model restrictions in that it is universally suitable for use with any sequential programming language and completely syntax independent (or source language independent).

Figure 16:
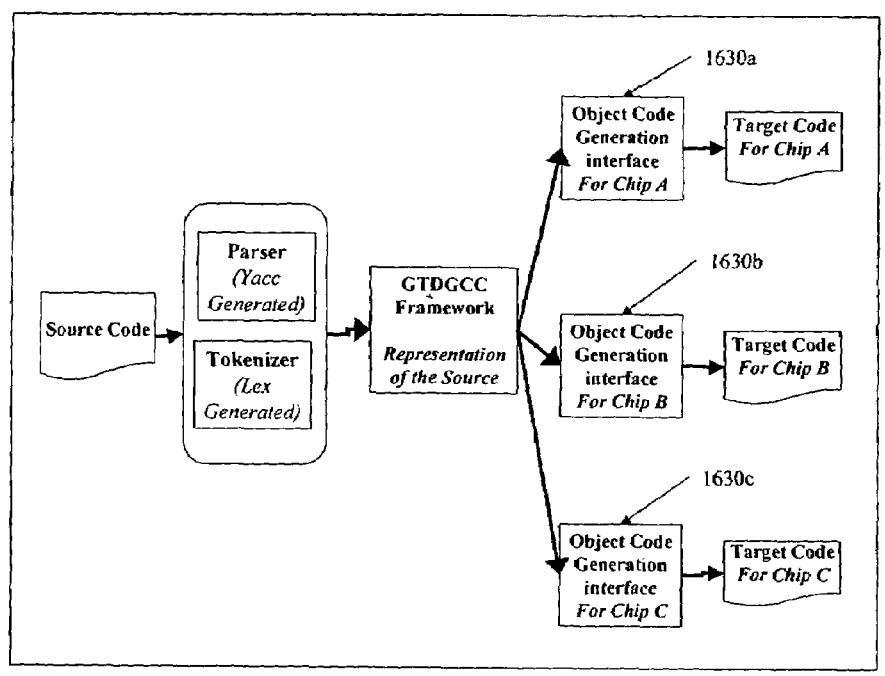
FIG. 16 is a schematic diagram of an exemplary Retargetable Compiler architecture using the Generic Typed DGC Classes Framework in accordance with the present invention.
Figure 17:
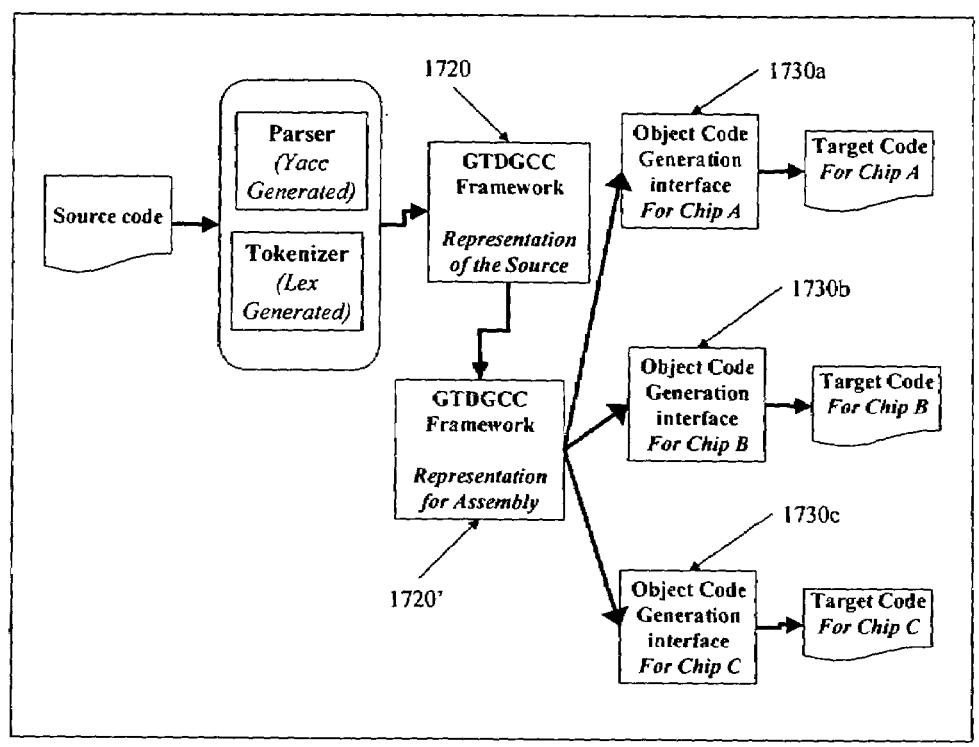
FIG. 17 is an exemplary schematic diagram of a Generic Typed DGC Classes Framework representation of the Assembly Language being derived from the Generic Typed DGC Classes Framework representation of the Source Language.

Furthermore, any imperative programming language can be represented using the present inventive Generic Typed DGC Classes Framework. Unlike the Three-Address codes that are suited for register based machines or chips, the present inventive Generic Typed DGC Classes Framework based compiler is retargetable in that it provides a generic representation of the source language and is independent of the target processor. Thus, the Generic Typed DGC Classes Framework can accommodate different interfaces to generate code for different machines and/or chips thereby being capable of compiling source code into machine code for different target processors using the same framework. The retargetable compiler is target independent and uses a description of the target architecture as input in order to generate code for a certain algorithm. FIG. 16 is a schematic diagram of an exemplary Retargetable Compiler architecture based on the Generic Typed DGC Classes Framework in accordance with the present invention. In the example shown in FIG. 16 three different Code Generation interfaces 1630*a*, 1630*b*, 1630*c* are provide, however, any number of interfaces can be implemented, as desired. Alternatively, as shown in FIG. 17, the Generic Typed DGC Classes Framework representation of the Assembly Language 1720' may be derived from the Generic Typed DGC Classes Framework representation of the Source Language 1720. Once again different code generation interfaces may be implemented on the Generic Typed DGC Classes Framework representation of the Assembly Language. The configuration shown in FIG. 17 is desirable in that the Generic Typed DGC Classes Framework of the Source Language is independent of and not burdened by the code generation interfaces 1730*a*, 1730*b*, 1730*c*.

Yet another advantage of the present inventive Generic Typed DGC Classes Framework based compiler over conventional compilers is with respect to code generation. Determining which machine code sequence is best for a given Three Address code construct may require extensive knowledge about the context in which that construct appears. Being compositional, every Generic Typed DGC Classes Framework construct has knowledge of the context required, whereas for Three Address code additional efforts are required to ascertain such information.

Still another advantage of using the Generic Typed DGC Classes Framework based compiler is that the compositional separateness eliminates the need for separate Symbol Tables for tracking all the symbol names used in the program and the essential information, associated with conventional compilers.

Interpreter

As previously discussed, a compiler translates the entire source program in advance to produce a separate file of executable machine code, which is then executed directly. In contrast, an interpreter is a computer program that executes the source code of another program by translating its statements one at a time into machine code instructions and executing them immediately. Interpreters are particularly useful in statically evaluating programs in the source language without a compiler. Since the Generic Typed DGC Classes Framework is language independent, a single universal Generic Typed DGC Classes Framework based interpreter can be used for any source language once the source language has been parsed and its semantics have been captured correctly into the Generic Typed DGC Classes Framework.

Static Analyzer

On a related note, the same Generic Typed DGC Classes Framework interpreter, when combined with the axiomatization of Execution Semantics based on Theory of Abstract Interpretation may serve as a Static Analyzer. A Static Program Analyzer (Abstract Interpreter) is a program written in a programming language (Meta Language, that is, a programming language used to manipulate logical proofs such as LISP or PROLOG) which receives as input the source code of a Source Program written in a programming language, analyzes the Source Program, and predicts the behavior of the Source Program without executing it. A static analyzer based on the Generic Typed DGC Classes Framework requires a parser interface and an analysis interface. Thus, the Generic Typed DGC Classes Framework based static analyzer can be used to predict approximate run-time program properties without executing the program as well as being used as a criteria-based optimizer for compilers.

These are but a few illustrative examples of the use of the present inventive Generic Typed DGC Classes Framework in accordance with the present invention. The universality and decompositional nature of the inventive framework makes it ideal for a wide variety of applications beyond those mentioned by way of example herein. Furthermore, the present inventive framework has unlimited future use because the fundamental core constructs therein can be extended for use with all future programming constructs without compromising on any thing that has been developed and is offered with the Generic Typed DGC Classes Framework.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

All of the references, publications and patents referred to herein are each incorporated by reference in their entirety. Any names or labels provided, for example, labels assigned to the different Types, are for illustrative purposes only and are not intended to limit the scope of the invention.

What is claimed is:

1. A method for universal programming language conversion between two different sequential programming languages including a source program in a first programming language and a target program in a second programming language, the method comprising the steps of:

parsing the source program in the first programming language using a parsing interface specific to the first programming language;

stripping all syntax from the parsed source program;

receiving as input the parsed source program without any syntax;

instantiating classes in a framework for capturing semantics of the parsed source program independent of syntax and execution model of the sequential programming languages;

producing a semantic representation of the parsed source program without any syntax; and receiving the semantic representation at a printer interface specific to the second programming language and adding the syntax of the target program in the second programming language.

2. The method in accordance with claim 1, wherein the source program is a high level programming language and the target program is a high level programming language.

3. The method in accordance with claim 1, wherein the source program is a high level programming language and the target program is a low level programming language.

4. The method in accordance with claim 1, wherein the classes are C++ classes representing fundamental core constructs of all sequential programming languages.

5. The method in accordance with claim 1, wherein the first and second programming languages are object oriented programming languages.

6. The method in accordance with claim 1, wherein the first and second programming languages are procedural programming languages.

7. An apparatus including a processor for universal programming language conversion between two different sequential programming languages including a source program in a first programming language and a target program in a second programming language, comprising: a parsing interface specific to the first programming language for parsing the source program in the first programming language and stripping all syntax from the parsed source program; a framework including instantiable classes for capturing a semantic representation of the parsed source program independent of syntax and execution model of the sequential programming languages; and a printer interface specific to the second programming language for receiving the semantic representation and adding the syntax of the target program in the second programming language.

8. The apparatus in accordance with claim 7, wherein the source program is a high level programming language and the target program is a high level programming language.

9. The apparatus in accordance with claim 7, wherein the source program is a high level programming language and the target program is a low level programming language.

10. The apparatus in accordance with claim 7, wherein the classes are C++ classes representing fundamental core constructs of all sequential programming languages.

11. The apparatus in accordance with claim 7, wherein the first and second programming languages are object oriented programming languages.

12. The apparatus in accordance with claim 7, wherein the first and second programming languages are procedural programming languages.

* * * * *